United States Patent [19]

Funayama

[11] Patent Number: 5,299,002
[45] Date of Patent: Mar. 29, 1994

[54] PICTURE QUALITY CORRECTING CIRCUIT FOR VIDEO APPARATUS

[75] Inventor: Mituo Funayama, Yaita, Japan

[73] Assignee: Sharp Kabushiki Kaisha, Osaka, Japan

[21] Appl. No.: 834,347

[22] Filed: Feb. 12, 1992

[30] Foreign Application Priority Data

May 31, 1991 [JP] Japan ................... 3-129734

[51] Int. Cl.$^5$ ............................................. H04N 9/64
[52] U.S. Cl. .................................... 348/607; 358/340
[58] Field of Search ............... 358/167, 340, 166, 336, 358/36; H04N 9/64

[56] References Cited

U.S. PATENT DOCUMENTS

| | | | |
|---|---|---|---|
| 4,698,696 | 10/1987 | Matsuo | 358/340 |
| 4,768,094 | 8/1988 | Ichinoi | 358/167 |
| 4,827,342 | 5/1989 | Ohta et al. | 358/167 |
| 4,860,105 | 8/1989 | Sakaguchi et al. | 358/167 |
| 5,079,633 | 1/1992 | Hagino et al. | 358/167 |
| 5,126,846 | 6/1992 | Niimura | 358/167 |
| 5,136,386 | 8/1992 | Okada | 358/167 |

FOREIGN PATENT DOCUMENTS

0422674A1 4/1991 European Pat. Off. .
0451283A1 10/1991 European Pat. Off. .
3126381 5/1991 Japan .
WO91/05434 4/1991 PCT Int'l Appl. .

Primary Examiner—Victor R. Kostak

[57] ABSTRACT

A picture quality correcting device which no longer relies solely on the frequency characteristic for picture quality correction, and which prevents disturbance in the group delay characteristic occurring due to a large variation in the frequency characteristic of the luminance signal, thereby greatly decreasing deterioration of picture quality of the played-back image. A noise component from the luminance signal is extracted by a noise canceller. Then, the noise component is deducted from the luminance signal by inverting the polarity of the noise component and composing it with the luminance signal. The high-frequency component of the luminance signal released by the noise canceller is corrected by a picture-tone circuit. The amount of noise suppression of the noise canceller and the amount of correction of the high-frequency component of the picture-tone circuit is made variable according to a control voltage by adjusting a picture quality adjuster. The amount of noise suppression of the noise canceller is adjusted, for example, according to a limiting level setting voltage generated by an LLC circuit.

24 Claims, 16 Drawing Sheets

PICTURE QUALITY CORRECTING CIRCUIT FOR VIDEO APPARATUS

FIELD OF THE INVENTION

The present invention relates to a picture quality correcting device provided in the luminance signal processing section of a video apparatus such as a videotape recorder.

DESCRIPTION OF THE BACKGROUND OF THE INVENTION

Video cassette recorders (referred to hereinafter as VCRs) etc. are conventionally provided with a picture quality correcting device for correcting image picture quality. There are several configurations possible for picture quality correction depending on the nature of the correction (such as noise suppression, correction of the frequency characteristic, or contour correction). Here, as a representative case, an explanation follows of a reproduction system provided in a VCR in which a luminance signal processing section carries out noise suppression and corrects the frequency characteristic.

As shown in FIG. 15, an FM signal (a frequency modulated luminance signal) from a video head, not shown, is demodulated into a luminance signal by an FM demodulator 61 in the luminance signal processing section, and is then sent to a noise canceller 62. In the noise canceller 62, a noise component is extracted from the luminance signal by a high-pass filter, not shown; then, this noise component is removed from the original luminance signal.

In a YNR (line correlation noise reduction circuit) 63 provided subsequent to the noise canceller 62, a noise component which is not in line correlation is excluded from the luminance signal. This is done by processing the luminance signal and another signal derived from it which is delayed by 1 H, utilizing the fact that the luminance signals corresponding to two adjacent lines are in correlation.

Further, in a picture-tone circuit 64 provided subsequent to the YNR 63, a high-frequency component of the luminance signal is corrected, the amount of correction corresponding to a control voltage generated by a picture quality adjuster $VR_{61}$. The control voltage is adjusted by manipulating the picture quality adjuster $VR_{61}$.

As shown in FIG. 16 by a broken line and an alternate long and short dash line, the picture-tone circuit 64 can increase or decrease a gain of 1 MHz or more by a maximum of approximately 10 dB. Furthermore, as shown in FIG. 17 by a broken line and an alternate long and short dash line, the picture-tone circuit 64 can increase or decrease a group delay of 1 MHz or more by a maximum of approximately 200 nsec. Using this picture-tone circuit 64 allows variation of the picture quality of the reproduced image to become linear with respect to the control voltage, as shown in FIG. 18.

Furthermore, the noise canceller 62 is arranged to switch the amount of noise suppression by changing the amplitude of the high-frequency component drawn out from the luminance signal. This amplitude of the high-frequency component changes according to the change in the limiting level of a limiter, not shown, provided in the noise canceller 62. This limiting level is set by resistors $R_{61}$ and $R_{62}$. In an SP (Standard Play) mode, the limiting level is set by the resistor $R_{61}$, and in an LP (Long Play) mode, the limiting level is switched by switching a transistor $Tr_{61}$ to ON so that the resistors $R_{62}$ and $R_{61}$ are connected in parallel.

On the other hand, when a recursive comb filter, for example, serves as the YNR 63, the YNR 63 is arranged to switch the amount of noise suppression by changing the amount of feedback in the input end of a 1 H delay element provided in the recursive comb filter, the amount of feedback being set by resistors $R_{63}$ and $R_{64}$. In the SP mode, the amount of feedback is set by the resistor $R_{63}$ and in the LP mode the amount of feedback is changed by switching a transistor $Tr_{62}$ to ON so that the resistors $R_{64}$ and $R_{63}$ are connected in parallel.

The switching ON and OFF of the transistors $Tr_{61}$ and $Tr_{62}$ is controlled by a control signal supplied to the respective bases via resistors $R_{65}$ and $R_{66}$. The control signal is released by a microcomputer 65 used in VCRs for system control, and is low level in the SP mode and high level in the LP mode.

With the arrangement described above, while the noise canceller 62 decreases noise in the horizontal direction of the image by eliminating the noise component in one line of the luminance signal, the YNR 63 decreases noise in the vertical direction of the image by using two adjacent lines to eliminate the noise component. The picture-tone circuit 64 makes it possible to improve the apparent definition of the image by emphasizing the high-frequency component of a luminance signal which renders detailed portions of the image.

When information recorded in a master video tape is copied (referred to hereinafter as dubbing) onto another video tape using a VCR provided with the arrangement described above, although the picture quality of the dubbed image has already been corrected by the playback VCR, on playing back the dubbed image, picture quality correction is carried out again. That is, picture quality correction ends up being carried out twice. Consequently, when dubbing is performed, a somewhat diffused image is the result, although there is a substantial suppression of noise.

In order to surmount this problem and to retain detailed portions of the image as far as possible, recently developed home-VCRs have been provided with a function known as edit mode. In the edit mode function, picture quality correction is limited to that which takes place during dubbing. An explanation follows hereinbelow of a picture quality correcting device of a VCR provided with this function.

As shown in FIG. 19, the picture quality correcting device comprises a noise canceller 71, a YNR (line correlation noise reduction circuit) 72, and a picture-tone circuit 73. The output end of an edit switch 74 is connected to the noise canceller 71 and the YNR 72. The picture-tone circuit 73 is set to be connected to the output terminal of a picture quality adjuster $VR_{71}$ when the edit switch 74 is OFF, and to a DC source 76 when the edit switch 74 is ON. This is done by means of a change-over switch 75.

In the picture quality correcting device arranged as described above, when the edit mode is selected by switching the edit switch 74 to ON, a voltage $V_{ED}$ is applied to the noise canceller 71 and the YNR 72. When this happens, the noise canceller 71 decreases the amount of noise suppression and the YNR 72 either decreases the amount of noise suppression or stops the suppression thereof.

The picture-tone circuit 73, on the other hand, flattens the corrected frequency characteristic according to a voltage of the DC source 76. Then, the luminance signal, having passed through the noise canceller 71, the YNR 72 and the picture-tone circuit 73, is mixed with a color signal in a mixing circuit 77 and becomes a video signal.

When the edit mode is used in such an arrangement, although a certain amount of noise remains, the high-frequency component of the luminance signal is not lost in the played-back image. This is because this arrangement, along with greatly limiting the effect of noise reduction, also makes the frequency characteristic of the luminance signal into a flat frequency characteristic. Consequently, when the dubbed image is played back, the remaining noise is eliminated by the picture quality correction of the play-back apparatus, and diffusion of the image is prevented, thus preventing deterioration in picture quality due to dubbing.

However, recent years have seen a large variation in quality of commercially available video-tapes. If recording and play-back are performed using poor quality video-tapes, the amplitude of the FM signal becomes small. As a result, the played-back image acquires a hard overall picture quality and noise begins to stand out. Of course, if recording and play-back are performed using good quality video-tapes, the played-back image acquires a soft overall picture quality and noise also does not stand out much. However, even with a good-quality video-tape, repeatedly performing recording and play-back causes the magnetic flux density of the tape surface to decrease, resulting in an increase in the tendency toward occurrence of noise in the image. For this reason, with the arrangement shown in FIG. 15, in order to obtain a good picture quality, it was hitherto necessary that the user correct picture quality by adjusting the gain of the picture-tone circuit 64 according to the quality of the video-tape. This had to be done by manipulating the picture quality adjuster $VR_{61}$.

Moreover, with the arrangement shown in FIG. 15, even if picture quality is corrected with the picture quality adjuster $VR_{61}$, the following problems occur, resulting in deterioration of image picture quality.

(1) If the frequency characteristic of the luminance signal is varied greatly by manipulating the picture quality adjuster $VR_{61}$, the group delay characteristic is disturbed and phase shift of the image tends to occur. This causes problems like overshoot or smear.

(2) When the high-frequency component of the luminance signal is emphasized by manipulating the picture quality adjusters $VR_{61}$, the noise component included in the high-frequency component also gets emphasized. Thus, although the played-back image has a high definition, noise stands out.

(3) When the high-frequency component of the luminance signal is attenuated by manipulating the picture quality adjuster $VR_{61}$, the noise component included in the high-frequency component also gets suppressed. However, if the amount of noise suppression is excessive, although the noise no longer stands out in the played-back image, the definition of the image deteriorates and the S/N does not improve much.

On the other hand, with the arrangement shown in FIG. 19, since S/N is not very good in the currently available home VCRs, using the edit mode can in fact cause a deterioration of the S/N. Consequently, when a soft tape or the like, whose S/N has deteriorated due to repeated play-back, is dubbed using the edit mode, the deterioration of the S/N becomes so evident in the copied image that it is hard on the eyes. Moreover, although the edit mode is effective in that the group delay characteristic remains undisturbed due to the arrangement whereby the frequency characteristic is not corrected, there nevertheless exists a possibility of noise standing out when an image with an extremely bad S/N is used for dubbing. This is because noise suppression has been arranged to be limited.

SUMMARY OF THE INVENTION

An object of the present invention, which has been developed in response to the problems existing in the conventional art described above, is to improve the S/N of the image by carrying out picture quality correction in the most suitable manner in response to the state of the luminance signal. This is done by combining the noise reduction and the correction of the frequency characteristic.

In order to achieve the above-mentioned object, a picture quality correcting device of the present invention is characterized in comprising the following means.

A picture quality correcting device of the present invention includes: a first horizontal direction noise suppressor for suppressing noise in the horizontal direction of an image by extracting a noise component from a luminance signal and removing this noise component from an original luminance signal; and a first frequency characteristic corrector for correcting the frequency characteristic of the luminance signal by adjusting a high-frequency component according to a control voltage.

The first horizontal direction noise suppressor is arranged so that the higher the control voltage, the lower the amount of noise suppression. The first frequency characteristic corrector is arranged so that it does not correct the high-frequency component within a specified range of the control voltage, this specified range including a value of the control voltage which serves as the central value for correction. The first frequency characteristic corrector is also arranged so that, in a voltage range higher than the specified range, the higher the control voltage, the more the attenuation of the high-frequency component; and so that, in a voltage range lower than the specified range, the lower the control voltage, the more the emphasis of the high-frequency component.

With the above arrangement, when the first frequency characteristic corrector attenuates the high-frequency component of the luminance signal, the first horizontal direction noise suppressor decreases the amount of noise suppression. Conversely, when the first frequency characteristic corrector emphasizes the high-frequency component of the luminance signal, the first horizontal direction noise suppressor increases the amount of noise suppression. Furthermore, although the high-frequency component of the luminance signal is corrected by the first frequency characteristic corrector according to the control voltage, it is not corrected when the value of the control voltage lies within the specified range which includes the control voltage serving as the central value for correction. Consequently, within the specified range, picture quality correction is carried out only by the first horizontal direction noise suppressor. Accordingly, disturbance in the group delay characteristic due to large variations in the frequency characteristic of the luminance signal can be prevented. This is because, by using both the correction of the frequency characteristic and the adjustment of the amount of noise suppression, picture quality correction no longer relies solely on the frequency characteristic.

Another picture quality correcting device of the present invention includes: a second horizontal direction noise suppressor for suppressing noise in the horizontal direction of an image by extracting a noise component from a luminance signal and removing this noise component from an original luminance signal; and a second frequency characteristic corrector means for correcting the frequency characteristic of the luminance signal by adjusting a high-frequency component according to a control voltage.

The second frequency characteristic corrector means is arranged so that it does not correct the high-frequency component within a specified range of the control voltage, this specified range including a value of the control voltage which serves as the central value for correction. The second frequency characteristic corrector is also arranged so that, in a voltage range higher than the specified range, the higher the control voltage, the more the attenuation of the high-frequency component. Also, it is arranged that in a voltage range lower than the specified range, the lower the control voltage, the more the emphasis of the high-frequency component. Moreover, the second horizontal direction noise suppressor is arranged so that the amount of noise suppression is minimized at a value of the control voltage which corresponds to or is greater than a maximum value of the specified range. The second horizontal direction noise suppressor is also arranged so that the amount of noise suppression increases when the control voltage both rises above and falls below this minimizing value.

With the above arrangement, when the second frequency characteristic corrector emphasizes the high-frequency component of the luminance signal, the second horizontal direction noise suppressor increases the amount of noise suppression. On the other hand, even when the second frequency characteristic corrector attenuates the high-frequency component of the luminance signal, the second horizontal direction noise suppressor increases the amount of noise suppression. Particularly in the case where the picture quality has been made hard by raising the definition of the image, the noise component gets emphasized along with the high-frequency component of the luminance signal. In such a case, good picture quality, i.e., a low-noise, high-definition image can be achieved by increasing the amount of noise suppression.

Another picture quality correcting device of the present invention includes a third horizontal direction noise suppressor for suppressing noise in the horizontal direction of an image by extracting a noise component from a luminance signal and removing this noise component from an original luminance signal; a vertical direction noise suppressor for suppressing noise in the vertical direction of the image by utilizing the correlation that exists between adjacent lines; a third frequency characteristic corrector for correcting the frequency characteristic of the luminance signal by adjusting a high-frequency component according to a control voltage; an envelope detector for detecting the envelope of a frequency-modulated luminance signal and for releasing a detection voltage; a control voltage switch for switching the control voltage to a constant voltage or to the detection voltage released by the envelope detector; and a noise suppression controller for increasing the amount of noise suppression of the vertical direction noise suppressor by a constant amount when the control voltage is switched to the detection voltage by the control voltage switch.

With the above arrangement, the higher the control voltage, the less the amount of noise suppression of the third horizontal noise suppressor. Moreover, the third frequency characteristic corrector is arranged so that it does not correct the high-frequency component of the demodulated luminance signal within a specified range of the control voltage, this specified range including the value of the control voltage which serves as the central value for correction. The third frequency characteristic corrector is also arranged so that, in a voltage range higher than the specified range, the higher the control voltage, the more the attenuation of the high-frequency component; and so that, in a voltage range lower than the specified range, the lower the control voltage, the more the emphasis of the high-frequency component.

In the picture quality correcting device, the envelope of the frequency-modulated luminance signal (referred to hereinafter as FM signal, for convenience) is detected by the envelope detector, and the detection voltage is supplied to the control voltage switch. A constant voltage is also supplied to the control voltage switch. The switching in the control voltage switch is usually performed manually.

When the constant voltage is applied from the control voltage switch to the third horizontal direction noise suppressor and the third frequency characteristic corrector, the operational characteristic of the third horizontal direction noise suppressor and of the third frequency characteristic corrector are fixed according to this constant voltage. Noise suppression and frequency correction of the luminance signal are then carried out with the respective operational characteristic. At this time, the vertical direction noise suppressor carries out noise suppression according to the normal operational characteristic.

On the other hand, when the detection voltage of the envelope detector is applied from the control voltage switch to the third horizontal direction noise suppressor and the third frequency characteristic corrector, the operational characteristic of the third horizontal direction noise suppressing means and of the third frequency characteristic correcting means are controlled according to the detection voltage. The higher the detection voltage, the less the amount of noise suppression by the third horizontal direction noise suppressing means. Conversely, the lower the detection voltage, the more the amount of noise suppression. As for the third frequency characteristic correcting means, the higher the detection voltage, the more the attenuation of the high-frequency component of the luminance signal; and conversely, the lower the detection voltage, the more the emphasis of the high-frequency component of the luminance signal. Moreover, the high-frequency component is not corrected at a value of the control voltage which lies within the specified range of the control voltage, the specified range including the value of the control voltage serving as the central value for correction. This range is set, for example, at values of voltages within which it can be presumed that the amplitude of the FM signal will be large and that the S/N of the luminance signal demodulated from the FM signal will be good. Here, the vertical direction noise suppressor increases the noise suppression by a constant amount according to the noise suppression controller.

Accordingly, it becomes possible to carry out the picture quality correction appropriate to the luminance signal of a played-back image previously recorded on a good-quality video tape. This becomes possible by, for example, setting the constant voltage within a range of the control voltage where the third frequency characteristic corrector does not carry out correction of the high-frequency component of the luminance signal; and by predeterminedly setting the operational characteristic of the third horizontal direction noise suppressor so that, at the constant voltage, the amount of noise suppression does not become too large. In other words, since the image in such a case has a sufficiently large play-back output and the luminance signal has a good S/N, slight picture quality correction suffices; that is, as described above, noise suppression is reduced and the high-frequency component is not corrected. This results in a good played-back image.

Furthermore, in cases where, for example, an image previously recorded on a poor-quality video tape is played back, it also becomes possible to carry out picture quality correction of the luminance signal according to the amplitude of the FM signal, based on the detection voltage of the envelope detecting means.

For example, when the amplitude of the FM signal is small, although noise stands out in the image, the S/N of the luminance signal can be raised by increasing the amount of noise suppression of the third horizontal direction noise suppressing means; and by obtaining, according to the third frequency characteristic correcting means, a frequency characteristic in which the high-frequency component is emphasized. This results in an improvement of the definition of the played-back image. Conversely, when the amplitude of FM signal is large, since in this case the noise component is small and the S/N is already good, a played-back image with a good definition can be achieved by: reducing the amount of noise suppression of the third horizontal direction noise suppressing means; and by obtaining, according to the third frequency characteristic correcting means, a frequency characteristic in which the high-frequency component is attenuated. Moreover, when picture quality correction is carried out based on the detection voltage, noise suppression in the vertical direction can be carried out by raising the noise suppression of the vertical direction noise suppressing means by a specified amount. As a result, a played-back image with a good S/N and high definition can be achieved.

Furthermore, when picture quality correction is carried out based on the detection voltage of the envelope detecting means, a good played-back image can be achieved even when the image has been recorded on a good-quality video tape. This becomes possible because: the noise suppression due to the third horizontal direction noise suppressing means is reduced; the correction of the high-frequency component by the frequency characteristic correcting means is not carried out; and the noise suppression due to the vertical direction noise suppressing means is strengthened.

Another picture quality correcting device of the present invention comprises: a fourth horizontal direction noise suppressing means for suppressing noise in the horizontal direction of an image by extracting a noise component from a luminance signal and deducting this noise component from an original luminance signal; a fourth frequency characteristic correcting means for correcting the frequency characteristic of the luminance signal by adjusting a high-frequency component according to a control voltage; noise suppression limiting means for limiting the amount of noise suppression, relative to the normal amount, of the fourth horizontal direction noise suppressing means when detailed portions of the image are to be rendered; and picture quality correspondence control voltage switching means for making the control voltage variable at normal times, and for switching the control voltage to a constant voltage when detailed portions of the image are to be rendered.

It is arranged so that the fourth horizontal direction noise suppressing means makes the amount of noise suppression variable at least when detailed portions of the image are to be rendered.

With the above arrangement, when detailed portions of the image are to be rendered, the amount of noise suppression of the fourth horizontal direction noise suppressing means is limited with respect to the normal amount by the noise suppression limiting means. Here, the control voltage, which controls the correction characteristic of the fourth frequency characteristic correcting means, is switched to a constant voltage by the picture quality correspondence control voltage switching means; along with this, the amount of noise suppression of the fourth horizontal direction noise suppressing means becomes variable.

Accordingly, during dubbing, for example, deterioration of the S/N of the duplicated image can be prevented irrespective of the S/N of the played-back image from which the dubbing is being carried out. This becomes possible because it is arranged so that the amount of noise suppression is adjusted when the correction characteristic of the fourth frequency characteristic correcting means is made constant and a limitation is introduced in the picture quality correction.

For a fuller understanding of the nature and advantages of the invention, reference should be made to the ensuing detailed description taken in conjunction with the accompanying drawings.

DESCRIPTION OF THE EMBODIMENTS

Figure 1:
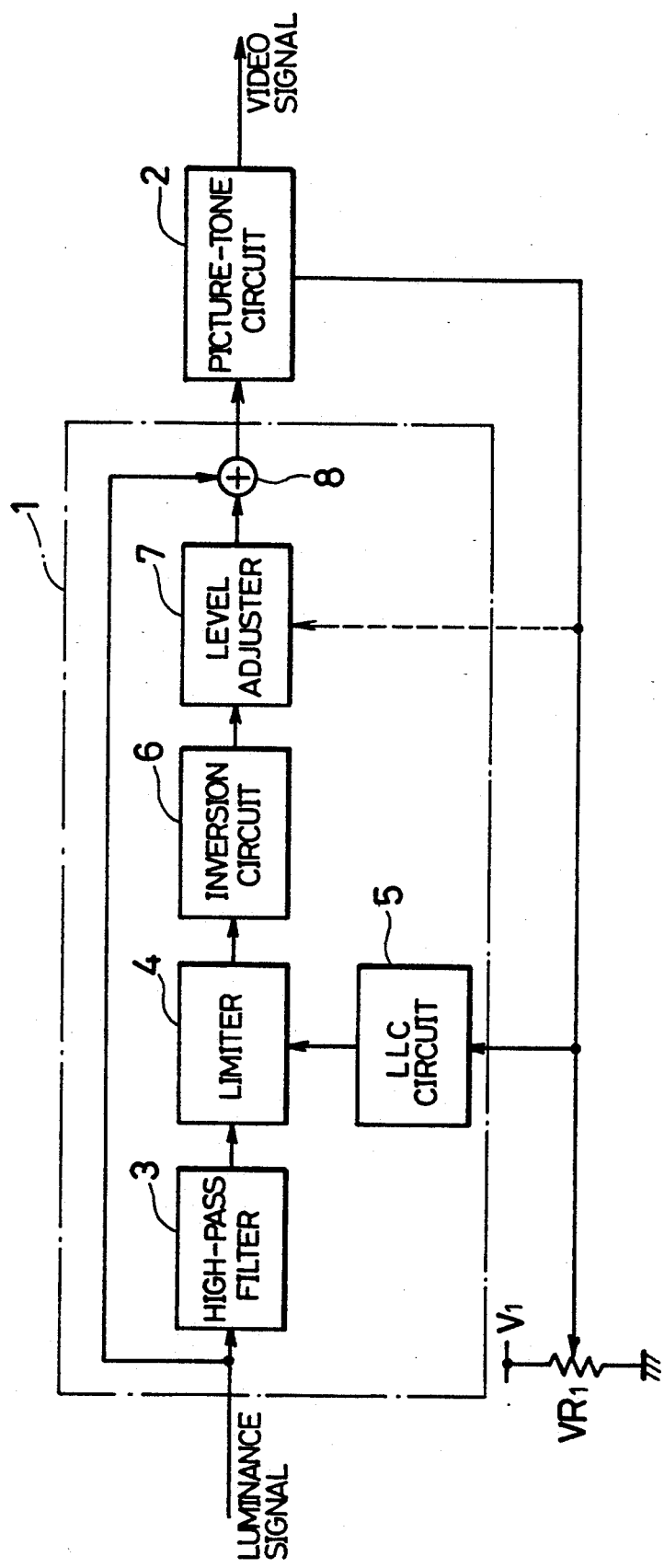
FIG. 1 is a block diagram showing the configuration of a picture quality correcting device of the first embodiment of the present invention.

A first embodiment of the present invention, as used in a VCR, is described hereinbelow, referring to FIGS. 1 to 7.

The VCR of the present embodiment is provided with a picture quality correcting device in the luminance signal processing section of its reproduction system. The picture quality correcting device has the configuration shown in FIG. 1; it comprises a noise canceller 1, a picture-tone circuit 2 and a picture quality adjuster $VR_1$.

The noise canceller 1 serves as a first horizontal direction noise suppressing means and comprises a high-pass filter 3, a limiter 4, a limiting level control circuit (referred to hereinafter as LLC circuit) 5, an inversion circuit 6, a level adjuster 7 and a composition circuit 8.

The noise canceller 1 deducts a noise component from a luminance signal in the following manner. The luminance signal is entered into the noise canceller 1 after demodulation. Then, the amplitude of the high-frequency component of the luminance signal extracted by the high-pass filter 3 is limited by the limiter 4 and the noise component thereby drawn out. The polarity of this noise component is then inverted by the inversion circuit 6. Thereafter, the level adjuster 7, which comprises a variable resistor, carries out level adjustment with the luminance signal. Then, the composition circuit 8 composes the luminance signal with the output of the level adjuster 7. The noise component is thus deducted from the luminance signal.

The noise canceller 1, configured as described above, is arranged so that the amount of noise suppression is adjustable. For example, it can be arranged so that an amplitude limiting range of the limiter 4 is adjusted by a limiting level setting voltage generated by the LLC circuit 5, the limiting level setting voltage being generated based on a control voltage adjusted by manipulating the picture quality adjuster $VR_1$. The level of the noise component eliminated from the luminance signal is accordingly adjusted. Alternatively, as shown in FIG. 1 by a broken line, it can be arranged so that the control voltage from the picture quality adjuster $VR_1$ is applied to the level adjuster 7, so as to make the resistance of the level adjuster 7 variable in response to the control voltage.

Figure 2:
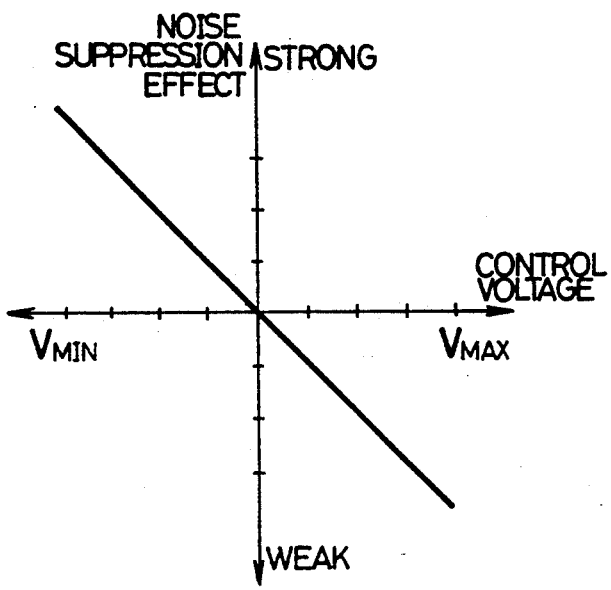
FIG. 2 is common to the first, third and fourth embodiments and shows the operational characteristic of a noise canceller in the picture quality correcting device of each of the embodiments.

That is, adjustment of the amount of noise suppression is carried out by controlling a composition ratio of the composition circuit 8, the composition ratio being controlled by varying the resistance of the level adjuster 7 by manipulating the picture quality adjuster $VR_1$. As shown in FIG. 2, this adjustment is arranged to be linear: the higher the control voltage, the weaker the noise suppression effect; conversely, the lower the control voltage, the stronger the noise suppression effect.

Figure 3:
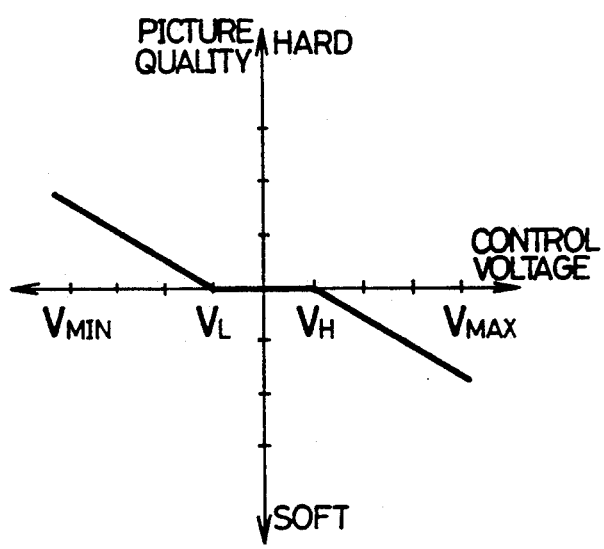
FIG. 3 is common to the first to fourth embodiments and shows the operational characteristic of a picture-tone circuit in the picture quality correcting device of each of the embodiments.

The picture-tone circuit 2, which serves as a first frequency characteristic correcting means, corrects the high-frequency component of the luminance signal based on the control voltage generated by the picture quality adjuster $VR_1$, as described later. As shown in FIG. 3, the picture-tone circuit 2 has a dead band within a specified range of the control voltage. The specified range includes a central value (further on, referred to as central voltage) of the control voltage lying between voltages $V_L$ and $V_H$. Within the dead band, the picture-tone circuit 2 does not carry out high-frequency component correction.

The picture-tone circuit 2 makes the picture quality soft according to an arrangement so that, the higher the control voltage within a range $V_H$-$V_{MAX}$, the more the attenuation of the high-frequency component. The picture-tone circuit 2 makes the picture quality hard according to an arrangement so that, the lower the control voltage within a range $V_{MIN}$-$V_L$, the more the emphasis of the high-frequency component. The range $V_H$-$V_{MAX}$ is higher than the specified range and the range $V_{MIN}$-$V_L$ is lower than the specified range. The central voltage is set to normally be approximately midway between the voltage $V_{MIN}$ and the voltage $V_{MAX}$.

A voltage $V_1$ is applied at one terminal of the picture quality adjuster $VR_1$. A control voltage between 0 V and $V_1$ V is generated by the picture quality adjuster $VR_1$ by adjusting its output voltage, the output voltage being varied by varying its resistance. The operational characteristic of the noise canceller 1 and of the picture-tone circuit 2 are controlled according to this control voltage.

Figure 4:
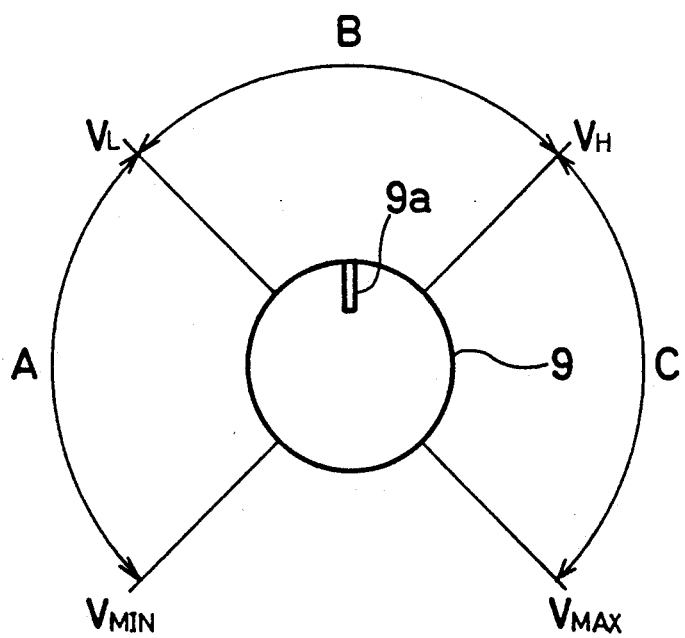
FIG. 4 is an explanatory diagram showing the control voltage adjustment range of an adjustment knob of the picture quality correcting device shown in FIG. 1.

As shown in FIG. 4, the picture quality adjuster $VR_1$ has an adjustment knob 9 whose manipulation by rotation to a region A ($V_{MIN}$-$V_L$), a region B ($V_L$-$V_H$), and a region C ($V_H$-$V_{MAX}$) allows the control voltage to be freely changed. This is done by changing the position of an adjustment indication mark 9a.

A detailed explanation follows of the picture-tone circuit 2.

Figure 5:
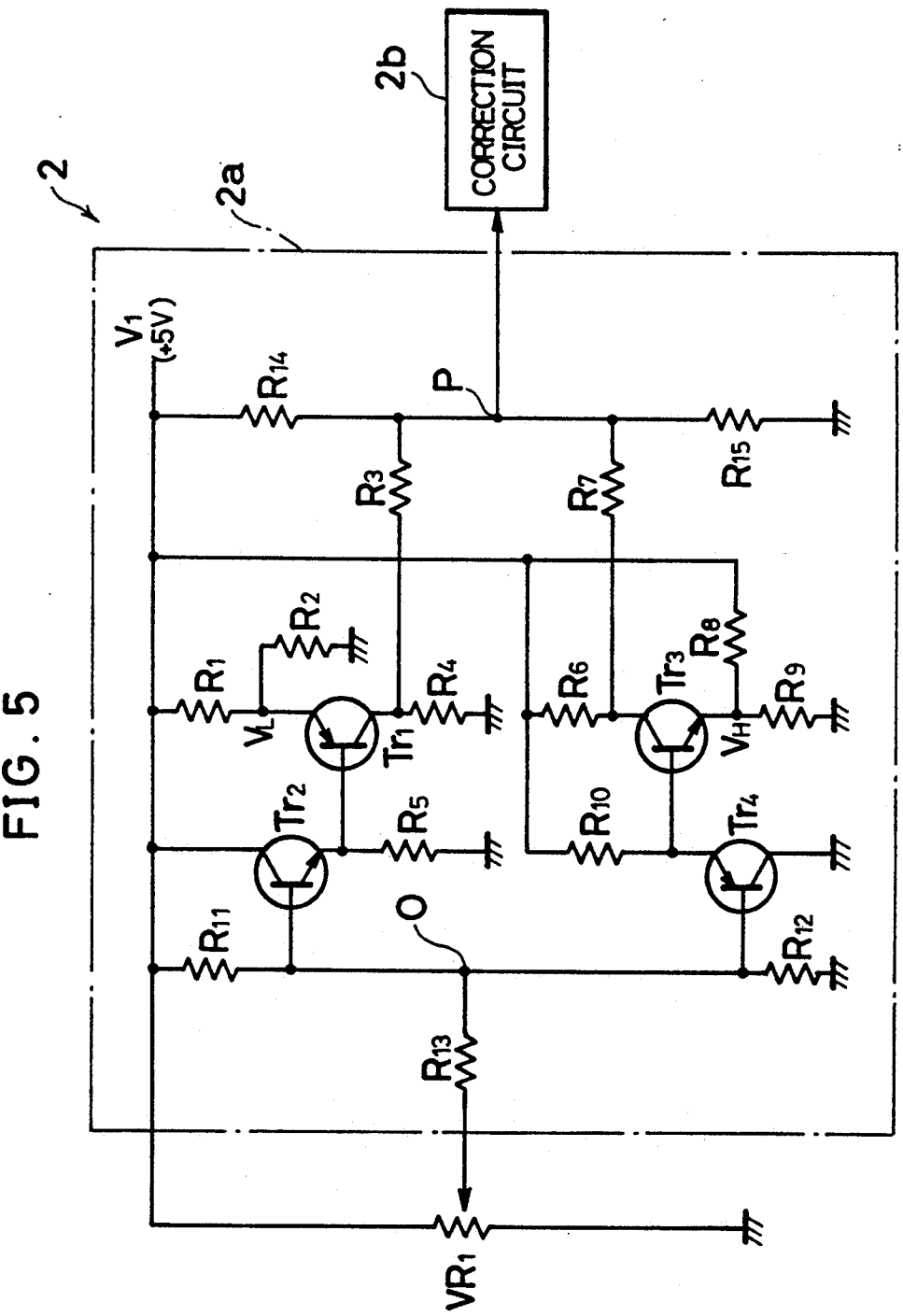
FIG. 5 is a circuit diagram showing the configuration of a dead band setting circuit provided in the picture-tone circuit of the picture quality correcting device shown in FIG. 1.

As shown in FIG. 5, the picture-tone circuit 2 ccomprises a dead band setting circuit 2a for setting the dead band, and a correction circuit 2b. In the configuration described hereinbelow, for convenience, the central voltage of the dead band is regarded to be 2.5 V. Also, $V_L=2.4$ V, $V_H=2.6$ V and a voltage $V_{BE}$ between the base and emitter of each of the transistors $Tr_1$, $Tr_2$, $Tr_3$ and $Tr_4$, described later, is regarded to be 0.7 V. The voltage of the input side (at point P) of the correction circuit 2b during the flattening of the high-frequency component (2 MHz) of the luminance signal is regarded to be 2.5 V.

The dead band setting circuit 2a comprises transistors $Tr_1$ and $Tr_2$ for determining a lower limit $V_L$ of the dead band and transistors $Tr_3$ and $Tr_4$ for determining an upper limit $V_H$ of the dead band. The emitter of the transistor $Tr_1$ is connected via a resistor $R_1$ to a power line having a voltage of $V_1$ V (+5 V), and is grounded via a resistor $R_2$. The collector of the transistor $Tr_1$ is connected to the input of the correction circuit 2b via a resistor $R_3$, and is grounded via a resistor $R_4$. The transistor $Tr_2$ has been provided for temperature compensation of the transistor $Tr_1$; its collector is connected to the power line and its emitter is connected to the base of the transistor $Tr_1$ as well as being grounded via a resistor $R_5$.

The collector of the transistor $Tr_3$ is connected to the power line via a resistor $R_6$, and is connected to the input of the correction circuit 2b via a resistor $R_7$. The emitter of the transistor $Tr_3$ is connected to the power line via a resistor $R_8$, and is grounded via a resistor $R_9$. The transistor $Tr_4$ has been provided for temperature compensation of the transistor $Tr_3$. Its emitter is connected to the power line via a resistor $R_{10}$, and to the base of the transistor $Tr_3$. Its collector is grounded.

The bases (point 0) of the transistors $Tr_2$ and $Tr_4$ are connected to the power line via a resistor $R_{11}$, are grounded via a resistor $R_{12}$ and are connected to an output terminal of the picture quality adjuster $VR_1$ via a resistor $R_{13}$. The resistors $R_{11}$, $R_{12}$, and $R_{13}$ have been provided as attenuators to expand the dynamic ranges of the transistors $Tr_2$ and $Tr_4$.

A resistor $R_{14}$ is provided between the power line and the resistor $R_3$ and a resistor $R_{15}$ is provided between the resistor $R_7$ and the ground. The resistors $R_{14}$ and $R_{15}$ have been provided in order to set the voltage at the point P accurately to 2.5 V. The voltage at the emitter of the transistor $Tr_1$ is set to be the voltage $V_L$ (2.4 V) and the voltage at the emitter of the transistor $Tr_3$ is set to be the voltage $V_H$ (2.6 V). It is also possible to set the voltage at the point P at approximately 2.5 V without providing the resistors $R_{14}$ and $R_{15}$ by: making the resistances of the resistors $R_3$ and $R_7$ equal; making the resistances of the resistors $R_4$ and $R_6$ equal; and ensuring that the relation between the resistances of the resistors $R_1$, $R_2$, $R_8$ and $R_9$ satisfies the following equation:

$$R_1 \cdot R_2/(R_1+R_2)=R_8 \cdot R_9/(R_8+R_9)$$

The correction circuit 2b corrects the high-frequency component of the luminance signal by undergoing changes in impedance in accordance with the variation in voltage at the point P. When the voltage at the point P varies within the range (2.5−0.5) V to (2.5+0.5) V, the high-frequency component is arranged to change within the range −8 dB to +8 dB. In the conventional configuration, the correction characteristic thereof is made linear with respect to the control voltage by connecting the correction circuit 2b to the picture quality adjuster $VR_1$. Whereas, the present embodiment operates with a correction characteristic having a dead band, as described earlier, due to the connection of the dead band setting circuit 2a to the correction circuit 2b. Here, in ranges other than the dead band range, the higher the voltage at the point P, the more the amount of correction of the high-frequency component.

When a voltage $V_O$, i.e., the control voltage, at the point 0 in the dead band setting circuit 2a is at or above 2.4 V, the base potential of the transistor $Tr_1$ is at or above 1.7 V and the transistor $Tr_1$ switches to OFF. On the other hand, when the voltage $V_O$ is at or below 2.6 V, the base potential of the transistor $Tr_3$ is at or below 3.3 V and the transistor $Tr_3$ switches to OFF. In other words, when the voltage $V_O$ lies within the range 2.4–2.6 V, both the transistors $Tr_1$ and $Tr_3$ are switched to OFF and, as shown in FIG. 6, the voltage $V_P$ at the point P is maintained at 2.5 V.

Figure 6:
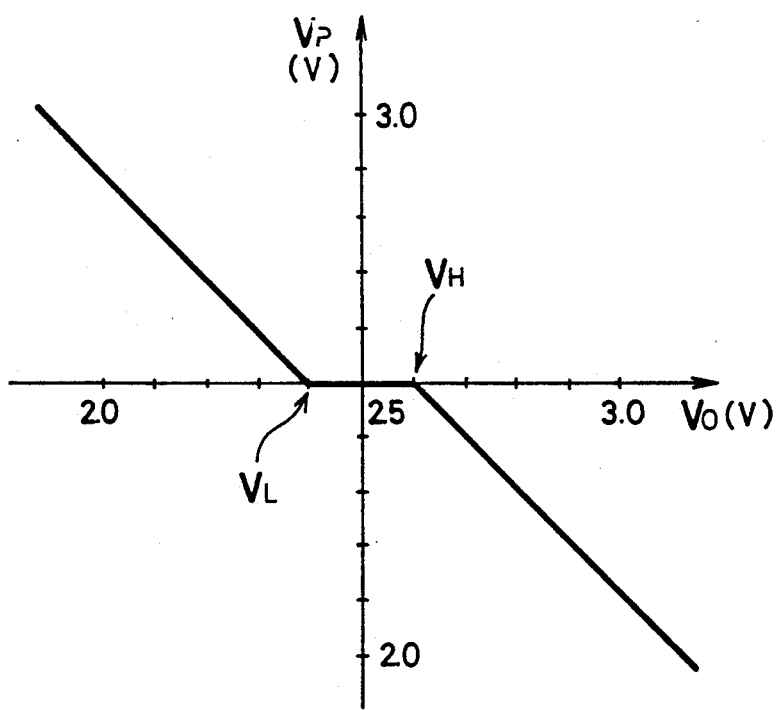
FIG. 6 shows the output voltage characteristic with respect to the input voltage, indicating the operation of the dead band setting circuit shown in FIG. 5.
Figure 7:
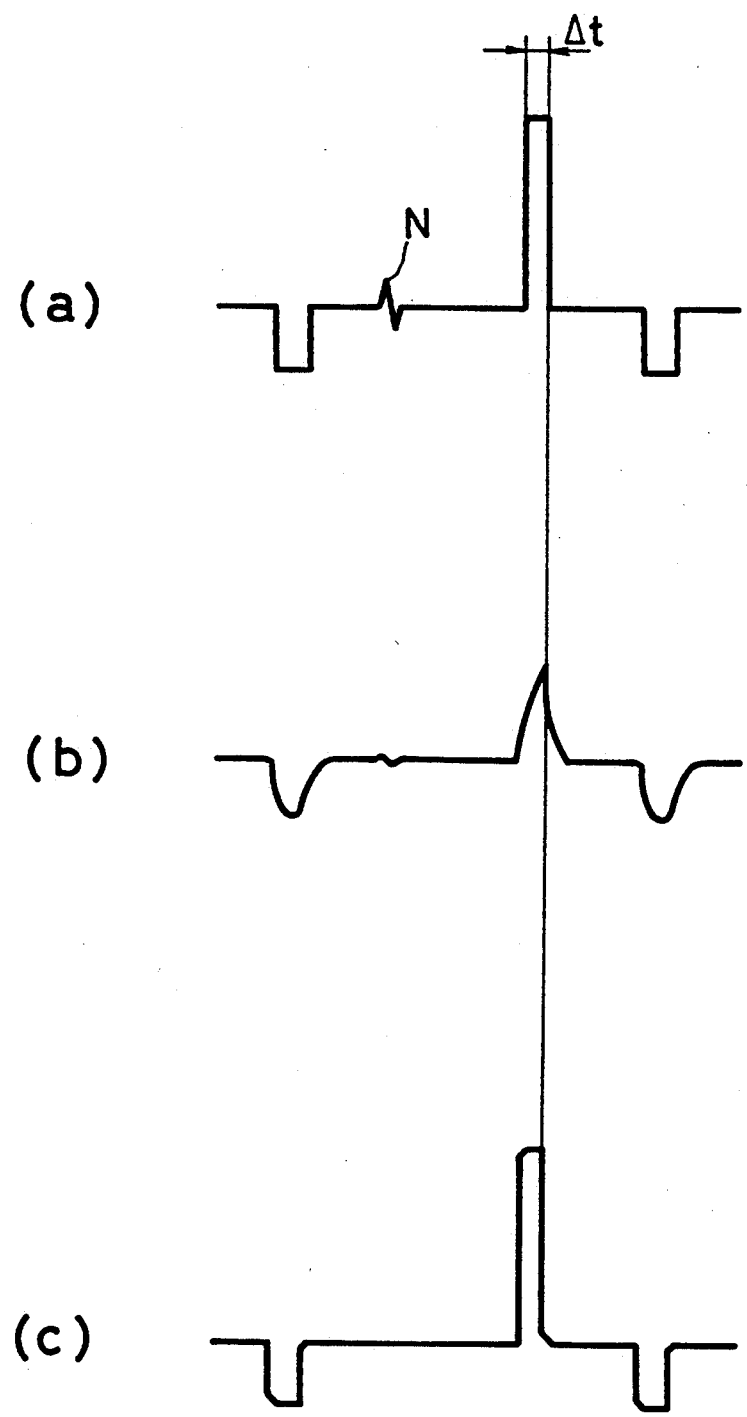
FIG. 7 is a diagram of the waveforms of the video signals, showing the improvement in picture quality due to the picture quality correcting device shown in FIG. 1.
Figure 8:
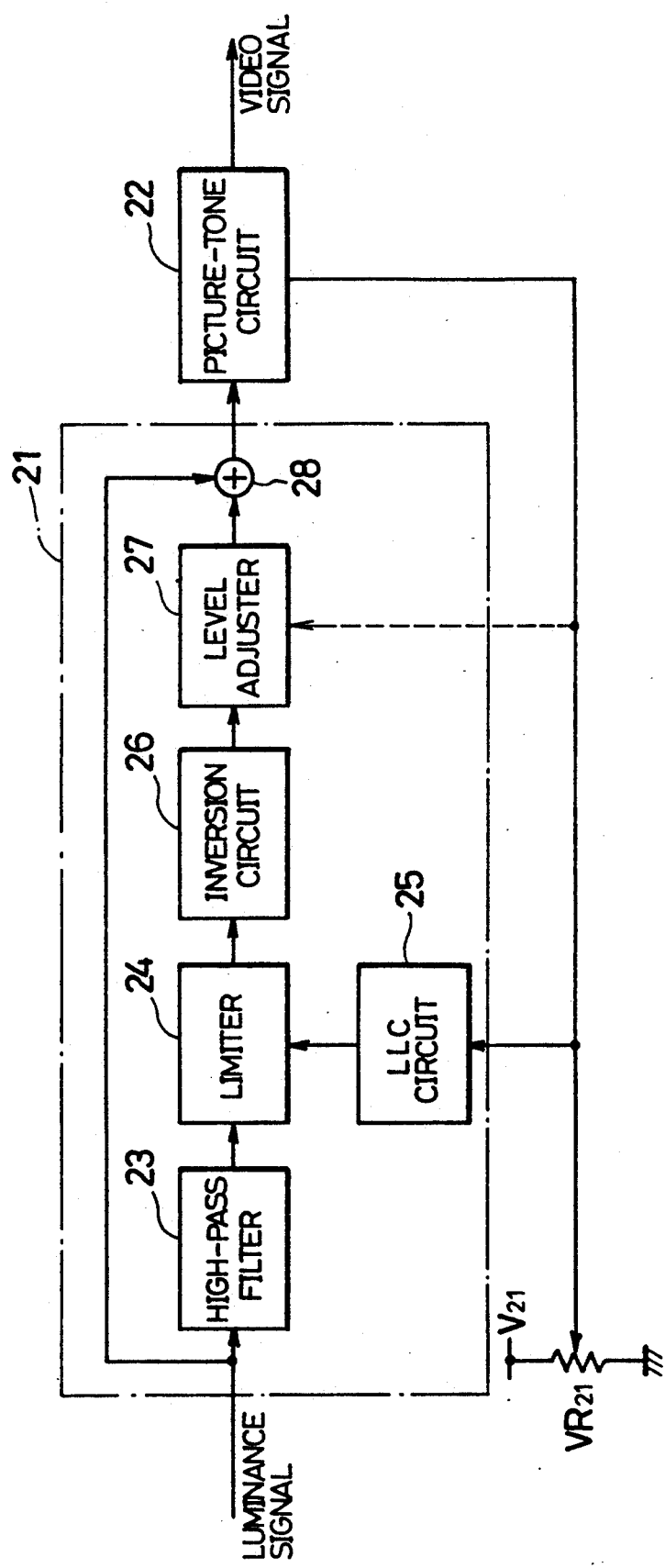
FIG. 8 is a block diagram showing the configuration of a picture quality correcting device of the second embodiment of the present invention.

When the voltage $V_O$ is less than 2.4 V, as shown in FIG. 6, the lower the voltage $V_O$, the higher is the voltage $V_P$. This happens because the transistor $Tr_1$ allows the current to flow to the point P. When, however, the voltage $V_O$ is more than 2.6 V, as shown in FIG. 6, the higher the voltage $V_O$, the lower is the voltage $V_P$. This happens because the transistor $Tr_3$ draws the current from the point P. According to this variation in voltage at the point P, the correction circuit 2b corrects the high-frequency component of the luminance signal with the correction characteristic shown in FIG. 3.

An explanation now follows regarding the operation of a picture quality correcting device having the configuration described above.

When the control voltage generated by the picture quality adjuster $VR_1$ is adjusted by rotating the adjustment knob 9 to the region A, the lower the control voltage, the more the amount of noise suppression by the noise canceller 1, the noise component of the luminance signal being suppressed in response to this. Furthermore, the lower the control voltage, the more the emphasis of the high-frequency component of the luminance signal by the picture-tone circuit 2. On the other hand, when the control voltage is adjusted by rotating the adjustment knob 9 to the region C, the higher the control voltage, the less the suppression of the noise component and the more the attenuation of the high-frequency component. When, however, the control voltage is adjusted by rotating the adjustment knob 9 to the region B, correction of the high-frequency component by the picture-tone circuit 2 does not take place and picture quality correction takes place only according to the noise canceller 1.

Accordingly, with the present embodiment, it is possible to reduce the range within which the frequency characteristic of the luminance signal varies to approximately one-third that of the conventional configuration. This becomes possible because: a range is provided by the picture-tone circuit 2 within which correction is not carried out; and because the amount of noise suppression of the noise canceller has been made variable. Thus, even when the control voltage is varied within the range $V_{MIN}$-$V_{MAX}$, disturbance of the group delay characteristic of the luminance signal due to correction carried out by the picture-tone circuit 2 practically disappears. As a result, it becomes possible to control to a large extent the generation of phase shift of the played-back signal and to reduce deterioration of picture quality of the played-back image due to problems such as overshoot or smear. Furthermore, the noise component can be reduced without causing deterioration in the frequency characteristic. This becomes possible because picture quality correction is carried out by using the noise canceller 1 and the picture-tone circuit 2 together. Particularly, when the control voltage is generated by rotating the adjustment knob 9 to the region B, there is no change in the frequency characteristic. As a result, phase shift does not occur in the played-back image and detailed portions are rendered with high definition due to noise suppression.

As shown in FIG. 7(a), consider, as an example, a case where a noise component N is included in the signal of an image which has a white portion on a black background, the white portion corresponding to a width Δt in the signal. Here, if an attempt is made to suppress the noise component N by strengthening the correction of the frequency characteristic, the amplitude of the white portion ends up becoming smaller due to an unintended suppression of the high-frequency component, as shown in FIG. 7(b). However, in the present embodiment, only a minute part of the high-frequency component is suppressed. As a result, as shown in FIG. 7(c), the unintended suppression practically disappears from the high-frequency component corresponding to the white portion, thus greatly improving the rendition of the image.

As described above, the picture quality correcting device of the present invention has a configuration so that, the higher the control voltage, the less the amount of noise suppression by the first horizontal direction noise suppressing means; and so that the first frequency characteristic correcting means does not carry out correction of the high-frequency component within a specified range of control voltage, this specified range including a value of the control voltage which serves as the central value for correction. The frequency characteristic correcting means is also arranged so that, in a voltage range higher than the specified range, the higher the control voltage, the more the attenuation of the high-frequency component; and so that, in a voltage range lower than the specified range, the lower the control voltage, the more the emphasis of the high-frequency component.

In this manner, by limiting the correction of the frequency characteristic as well as by making the amount of noise suppression variable, not only can the noise component be decreased without causing deterioration in the frequency characteristic of the luminance signal, but also disturbance of the group delay characteristic due to a large variation in the frequency characteristic of the luminance signal can be prevented, since picture quality correction no longer relies only on the frequency characteristic. Consequently, it becomes possible to prevent to a large extent the generation of phase shift of the played-back signal and to prevent deterioration of picture quality of the played-back image due to problems such as overshoot or smear.

A second embodiment of the present invention, as used in a VCR, is described hereinbelow, referring to FIG. 3 and FIGS. 8 to 11.

The VCR of the present embodiment is provided with a picture quality correcting device in the luminance signal processing section of its reproduction system. The picture quality correcting device has the configuration shown in FIG. 8; it comprises a noise canceller 21, a picture-tone circuit 22 and a picture quality adjuster $VR_{21}$.

The noise canceller 21 serves as a second horizontal direction noise suppressing means and comprises a high-pass filter 23, a limiter 24, an LLC circuit 25, an inversion circuit 26, a level adjuster 27 and a composition circuit 28. An explanation is omitted here of the high-pass filter 23, the limiter 24, the inversion circuit 26, and the composition circuit 28 since these function in the same manner as those in the noise canceller 1 of the first embodiment.

Figure 9:
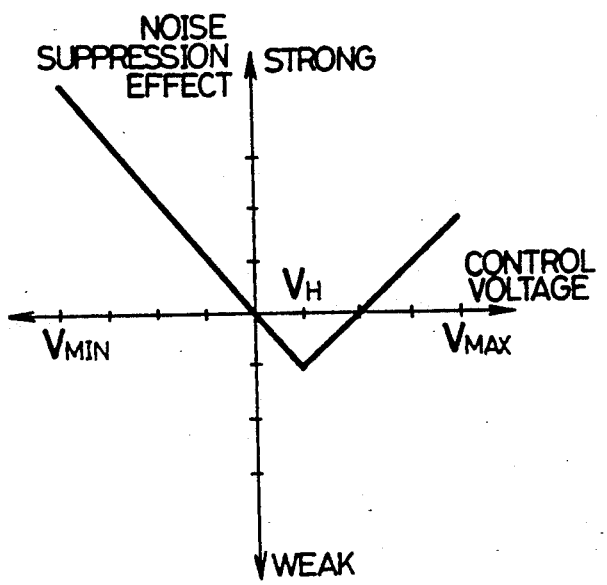
FIG. 9 shows the operational characteristic of a noise canceller in the picture quality correcting device shown in FIG. 8.

The amount of noise suppression carried out by the noise canceller 21 is arranged to be adjustable by controlling either: a limiting level setting voltage generated by the LLC circuit 25; or, the resistance of the level adjuster 27. As shown in FIG. 9, the noise canceller 21 differs from the noise canceller 1 in that the amount of noise suppression is minimized when the value of the control voltage lies within a range $V_H$-$V_{MAX}$. The higher or lower the control voltage with respect to this minimizing voltage, the stronger the noise suppression effect.

The picture-tone circuit 22 serves as a second frequency characteristic correcting means. Like the picture-tone circuit 2 of the first embodiment, it corrects the frequency characteristic of the luminance signal and, as shown in FIG. 3, does not correct the high-frequency component within a specified range $V_L$-$V_H$ of the control voltage.

Figure 10:
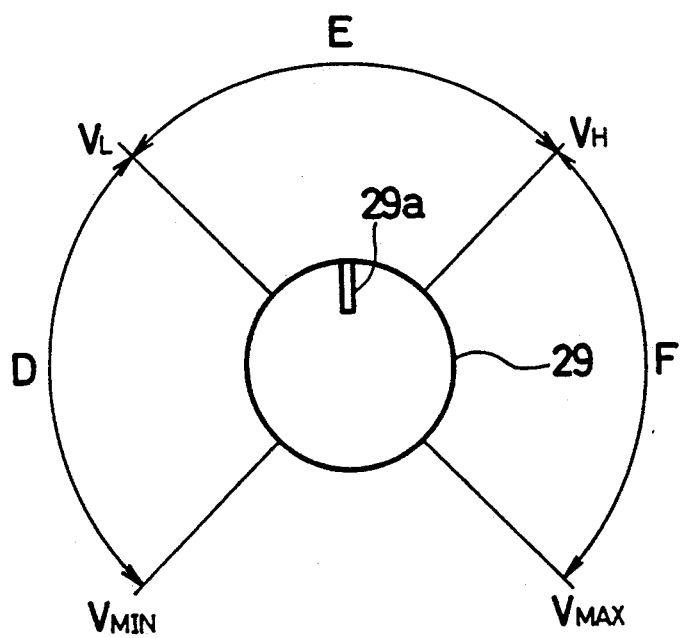
FIG. 10 is an explanatory diagram showing the control voltage adjustment range of an adjustment knob of the picture quality correcting device shown in FIG. 8.

A voltage $V_{21}$ is applied at one terminal of the picture quality adjuster $VR_{21}$. The adjustable control voltage is generated by varying its resistance. The operational characteristic of the noise canceller 21 and that of the picture-tone circuit 22 are controlled according to this control voltage. As shown in FIG. 10, the picture quality adjuster $VR_{21}$ has an adjustment knob 29 whose manipulation by rotation to a region D ($V_{MIN}$-$V_L$), a region E ($V_L$-$V_H$), and a region F ($V_H$-$V_{MAX}$) allows the control voltage to be adjustable. This is done by changing the position of an adjustment indication mark 29a.

With the above arrangement, when the control voltage generated by the picture quality adjuster $VR_{21}$ is adjusted by rotating the adjustment knob 29 either to the region D or F, the higher or lower the control voltage, the more the amount of noise suppression by the noise canceller 21, the noise component of the luminance signal being suppressed accordingly. In the region D, the lower the control voltage, the more the emphasis of the high-frequency component of the luminance signal by the picture-tone circuit 22. In the region F, the higher the control voltage, the more the attenuation of the high-frequency component of the luminance signal. However, when the control voltage is set within the region E of the adjustment knob 29, the correction of the high-frequency component by the picture-tone circuit 22 is not carried out, and picture quality correction is carried out only by the suppression of the noise component by the noise canceller 21.

Figure 11:
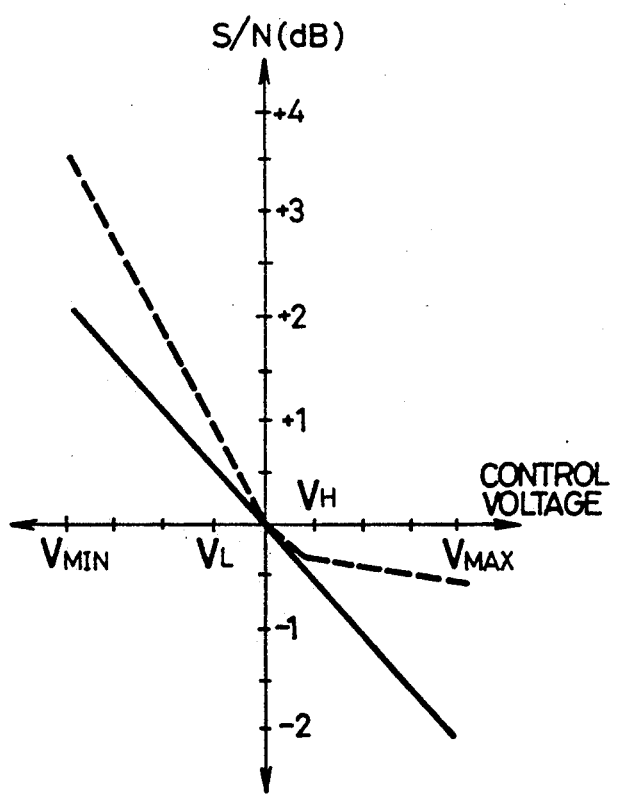
FIG. 11 shows the S/N characteristic of the video signal with respect to the control voltage, indicating the improvement in picture quality due to the picture quality correcting device shown in FIG. 8.
Figure 12:
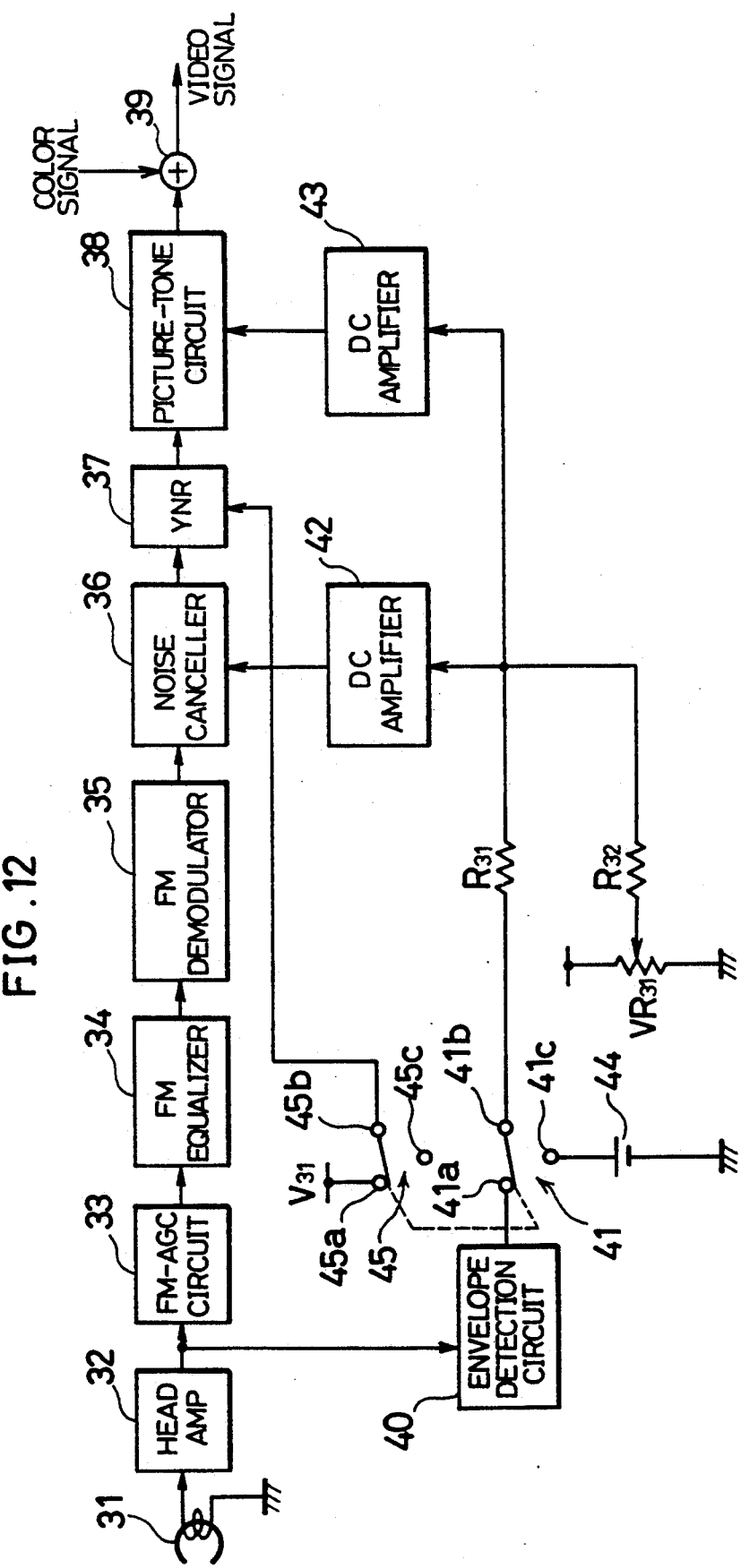
FIG. 12 is a block diagram showing the configuration of a picture quality correcting device of the third embodiment of the present invention.

According to the operation described above, the S/N of the luminance signal is better in a low range and a high range of the control voltage compared to that of the conventional arrangement. FIG. 11 shows the S/N according to the conventional arrangement (solid line) and the improved S/N (broken line).

According to the present invention, even in the case where the high-frequency component of the luminance signal is emphasized, the amount of noise suppression is arranged to increase. This results in a slight decrease in definition compared to the configuration of the first embodiment, particularly when the picture quality is corrected in the hard direction. However, as described earlier, the noise component emphasized along with the high-frequency component is suppressed, and a low-noise image is achieved.

The picture quality correcting device of the present embodiment has a configuration so that the second frequency characteristic correcting means does not carry out correction of the high-frequency component within a specified range of control voltage, this specified range including the value of the control voltage which serves as the central value for correction. The second frequency characteristic correcting means is also arranged so that, in a voltage range higher than the specified range, the higher the control voltage, the more the attenuation of the high-frequency component. Also, it is arranged that in a voltage range lower than the specified range, the lower the control voltage, the more the emphasis of the high-frequency component. Moreover, the second horizontal direction noise suppressing means is arranged so that the amount of noise suppression is minimized at a value of a control voltage which corresponds to or is greater than a maximum value of the specified range. The second horizontal direction noise suppressing means is also arranged so that the amount of noise suppression increases both when the control voltage rises above and falls below this minimizing control voltage.

Accordingly, as in the picture quality correcting device of the previous embodiment, the disadvantage of relying only on the frequency characteristic for picture quality correction is done away with in the picture quality correcting device of the present embodiment. Moreover, although the noise component does get emphasized along with the high-frequency component of the luminance signal, particularly so when the picture quality is made hard, this noise component can be reduced by increasing the amount of noise suppression. Consequently, even if the picture quality is made hard, a low-noise, well-defined image is achieved.

A third embodiment of the present invention, as used in a VCR, is described hereinbelow, referring to FIGS. 2, 3, 12, and 13.

The VCR of the present embodiment is provided with a luminance signal processing section in its reproduction system. The luminance signal processing section has the configuration shown in FIG. 12. In this luminance signal processing section, a played-back signal, which is played back via a video head 31, is amplified by a head amp 32. This played-back signal is separated by a filter (not shown) into a low band converted color signal and a frequency modulated luminance signal, i.e., an FM signal. The low band converted color signal is converted into a color signal by a color signal processing section (not shown). The FM signal is set to a specified level by an FM-AGC circuit 33. The amplitude of the attenuated high-frequency component is corrected by an FM equalizer 34. Then, the signal is demodulated into the luminance signal by an FM demodulator 35.

As will be described in detail later, a noise component in the horizontal direction of the image is eliminated by a noise canceller 36, and a noise component in the vertical direction of the image is eliminated by a YNR 37. Then, the high-frequency component is corrected by a picture-tone circuit 38. The luminance signal released by the picture-tone circuit 38 is mixed in a mixing circuit 39 with a color signal, converted by the color signal processing section, to become a video signal.

The FM signal separated from the played-back signal released by the head amp 32 is also entered into an envelope detection circuit 40. The envelope detection circuit 40 serves as envelope detecting means and comprises a peak detection circuit for carrying out peak detection of the amplitude of the FM signal, and an amplifier. The envelope detection circuit 40 detects the envelope of the FM signal. The amplifier releases a detection voltage (DC signal) which varies in response to the amplitude variation of the FM signal.

The detection voltage released by the envelope detecting circuit 40 is entered into a change-over switch 41. The change-over switch 41 comprises contact points 41a and 41c, and a common terminal 41b. The contact point 41a is connected to the output terminal of the envelope detection circuit 40. The common terminal 41b is connected to input terminals of DC amplifiers 42 and 43 via a resistor $R_{31}$. A DC power source 44 is connected to the contact point 41c.

The change-over switch 41 is interlinked with a switch 45, described later. The change-over switch 41 functions as control voltage switching means: when picture quality correction is carried out automatically, the change-over switch 41 connects the envelope detection circuit 40 and the DC amplifiers 42 and 43; when picture quality correction is carried out manually, the change-over switch 41 connects the DC power source 44 and the DC amplifiers 42 and 43.

The voltage of the DC power source 44 is set to be substantially the same as the detection voltage of the envelope detection circuit 40 when, for example, recording and reproduction are carried out on and from a standard video tape using the same video tape recorder (this will be referred to hereinafter as self recording-reproduction). In the present embodiment, this voltage is amplified by the DC amplifiers 42 and 43 and becomes the central value of the control voltage.

The switch 45 comprises contact points 45a and 45c, and a common terminal 45b, the connections being switched manually. A voltage $V_{31}$ is applied to the contact point 45a. The common terminal 45b is connected to a control input terminal of the YNR 37. The contact point 45a is kept unconnected. When the contact point 45a and the common terminal 45b are connected, the voltage $V_{31}$ is applied to the YNR 37; when the contact point 45c and the common terminal 45b are connected, no-voltage is supplied to the YNR 37. As described later, the switch 45 functions as noise suppression switching means since the amount of noise suppression carried out by the YNR 37 is switched according to whether or not the voltage $V_{31}$ is released by the switch 45.

The DC amplifiers 42 and 43 are amplifiers that suitably amplify the voltage entered via the switch 41 so as to generate the control voltages applied respectively to the noise canceller 36 and the picture-tone circuit 38. Furthermore, the input terminals of the DC amplifiers 42 and 43 are also connected to the output terminal of a picture quality adjuster $VR_{31}$ via a resistor $R_{32}$. The voltage adjusted according to the picture quality adjuster $VR_{31}$ is entered into the DC amplifiers 42 and 43.

The noise canceller 36 serves as a third horizontal direction noise suppressing means and functions similarly to the noise canceller 1 of the first embodiment: as shown in FIG. 2, the higher the control voltage generated by the DC amplifier 42, the weaker the noise suppression effect; and the lower the control voltage generated by the DC amplifier 42, the stronger the noise suppression effect.

The YNR 37 serves as vertical direction noise suppressing means and carries out noise reduction using the fact that video signals of adjacent lines are in correlation. It comprises, for example, a recursive comb filter provided with a 1 H delay element. The YNR 37 makes the amount of noise suppression variable by controlling the amount of feedback of the output signal to the input terminal of the 1 H delay element. When, however, the voltage $V_{31}$ is applied via the switch 45, the noise suppression is arranged to increase only by a specified amount. In stead of the YNR 37, a line noise canceller may, for example, be used as the vertical direction noise suppressing means.

The picture-tone circuit 38 serves as a third frequency characteristic correcting means and functions similarly to the picture-tone circuit 2 of the first embodiment: as shown in FIG. 3, when the control voltage lies between the specified range $V_L$-$V_H$, the correction of the high-frequency component is not carried out.

In order to carry out picture quality correction according to the above arrangement, it is first necessary to select whether the correction is to be carried out automatically or manually. This is done by switching the switch 45. When automatic picture quality correction is turned to OFF by connecting the contact point 45c and the common terminal 45b of the switch 45. The contact point 41c and the common terminal 41b of the change-over switch 41 get connected. This happens because the change-over switch 41 and the switch 45 are interlinked. Accordingly, the voltage from the DC power source 44 and the voltage from the picture quality adjuster $VR_{31}$ are applied to the DC amplifiers 42 and 43.

The amount of noise suppression by the noise canceller 36 is adjusted according to the control voltage released by the DC amplifier 42, the DC amplifier 42 releasing this control voltage by amplifying the voltages applied thereto. The noise component of the luminance signal from the FM demodulator 35 is suppressed accordingly.

The luminance signal is then entered into the YNR 37, where the amount of noise suppression is fixed at a normal level. In the YNR 37, the noise component of the luminance signal is suppressed according to this level. Then, the luminance signal is entered into the picture-tone circuit 38, where the amount of correction is adjusted according to the control voltage released by the DC amplifier 43, the DC amplifier 43 releasing this control voltage by amplifying the voltages applied thereto. The high-frequency component of the luminance signal is corrected accordingly.

Here, when the resistance of the picture quality adjuster $VR_{31}$ is kept fixed at a constant value, the above circuits carry out noise suppression and correction of the frequency characteristic according to the resulting voltage. When, however, the picture quality adjuster $VR_{31}$ is adjusted manually, the amount of noise suppression by the noise canceller 36 and the YNR 37, and the correction of the high-frequency component by the picture-tone circuit 38 vary according to the manual adjustment.

When the contact point 45a and the common terminal 45b of the switch 45 are connected, automatic picture quality correction is turned to ON, and the contact point 41a and the common terminal 41b of the change-over switch 41 get connected. In this case, the detection voltage from the envelope detection circuit 40 and the output voltage from the picture quality adjuster $VR_{31}$ are entered into the DC amplifiers 42 and 43. Here, normally, the resistance of the picture quality $VR_{31}$ is kept fixed at a specified value and picture quality correction is carried out automatically on the basis of the detection voltage.

When the amplitude of the FM signal is small, the detection voltage of the envelope detection circuit 40 becomes low and the amount of noise suppression of the noise canceller 36 increases, thereby increasing the noise suppression effect. The amount of noise suppression in the YNR 37 is also strengthened by applying the voltage $V_{31}$ via the switch 45, the noise suppression thereby increasing by a constant amount. On the other hand, the high-frequency component is emphasized by the picture-tone circuit 38, the picture quality being thereby corrected in the hard direction. Accordingly, the S/N of the video output can be improved even if the S/N of the demodulated luminance signal is bad due to a small played-back signal from the video head 31, thereby improving the definition of the image.

When the amplitude of the FM signal is large, the detection voltage of the envelope detection circuit 40 becomes high and the amount of noise suppression of the noise canceller 36 is reduced, thereby weakening the noise suppression effect. The amount of noise suppression in the YNR 37 is strengthened, as described above. The high-frequency component is attenuated by the picture-tone circuit 38, the picture quality being thereby corrected in the soft direction. Since a sufficiently high S/N can be achieved when the played-back signal from the video head 31 is large, picture quality correction is reduced. As a result, an image with a better definition is achieved.

When the amplitude of the FM signal is of a medium magnitude, only a medium amount of noise suppression takes place in the noise canceller 36. The picture-tone circuit 38 does not carry out correction of the high-frequency component when the value of the control voltage lies within the range $V_L$-$V_H$. In this case, since the S/N of the luminance signal is relatively good, picture quality correction is carried out by suitably effecting the noise suppression and by not carrying out correction of the high-frequency component.

Figure 13:
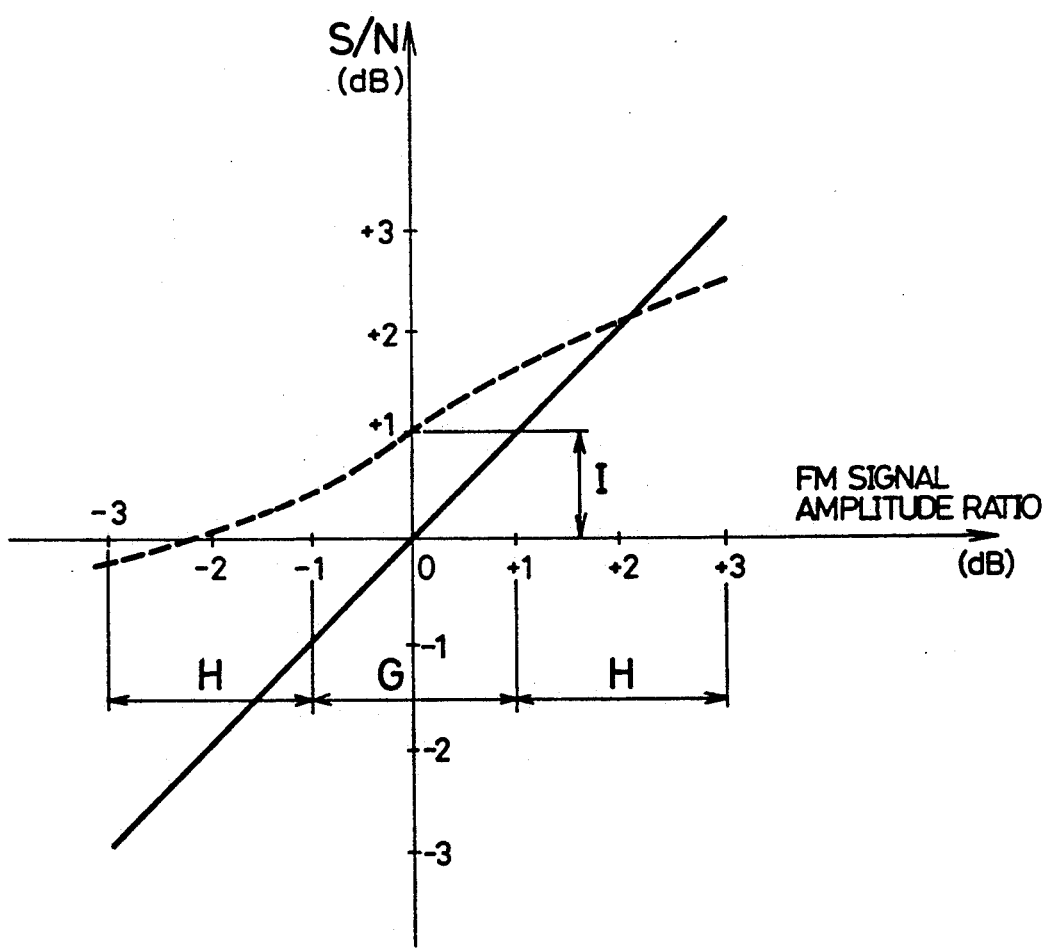
FIG. 13 shows the S/N characteristic of the video signal with respect to the amplitude of an FM signal, indicating the improvement in picture quality due to the picture quality correcting device shown in FIG. 12.

Consequently, when automatic picture quality correction is turned to OFF, as shown in FIG. 13 by a solid line, the S/N of the luminance signal becomes linear with respect to the amplitude of the FM signal by fixing the resistance of the picture quality adjuster $VR_{31}$ to a specified value. However, when automatic picture quality correction is turned to ON, picture quality correction is carried out by the noise canceller 36 within a range G, i.e., between −1 dB and +1 dB; by the noise canceller 36 and the picture-tone circuit 38 within ranges H, i.e., between −3 dB and −1 dB and between +1 dB and +3 dB (this is shown by a broken line in FIG. 13). Here, the amplitude of an FM signal, released when self recording-reproduction is performed on a standard video, is taken as a reference value. Accordingly, the S/N of a luminance signal can be increased particularly when the amplitude thereof is small. Furthermore, within a range I where the S/N is between 0 dB and +1 dB, the S/N increases by a specified amount (1 dB) due to the noise suppression by the YNR 37.

Accordingly, during the play-back of an image recorded on a video tape in which, for example, the surface magnetic flux density has decreased, it becomes possible in the present embodiment to automatically correct the picture quality in the most appropriate manner. Moreover, even when an image recorded on a good quality video tape having a good S/N is played back, the picture quality can be improved, making it possible to get an image with good definition. In other words, the picture quality correction appropriate to the level of the played-back signal is carried out, resulting in a better quality image. Moreover, since picture quality correction no longer relies only on the correction of the frequency characteristic by the picture-tone circuit 38, phase shift of the image due to a large variation in the high-frequency component of the luminance signal can be prevented, as in the first and second embodiments.

As described above, a picture quality correcting device of the present invention comprises: envelope detecting means for detecting the envelope of a frequency-modulated luminance signal; control voltage switching means for switching a control voltage to a constant voltage or to a detection voltage released by the envelope detecting means; and noise suppression controlling means for increasing the amount of noise suppression of the vertical direction noise suppressing means by a constant amount when the control voltage is switched to the detection voltage by the control voltage switching means. The picture quality correcting device of the present invention includes: a third horizontal direction noise suppressing means which is arranged so that, the higher the control voltage, the less the amount of noise suppression; and a third frequency characteristic correcting means which is arranged so that it does not carry out correction of the high-frequency component of the demodulated luminance signal within a specified range of the control voltage, this specified range including the control voltage which serves as the central value for correction. The third frequency characteristic correcting means is also arranged so that, in a voltage range higher than the specified range, the higher the control voltage, the more the attenuation of the high-frequency component; and so that, in a voltage range lower than the specified range, the lower the control voltage, the more the emphasis of the high-frequency component.

When an image recorded on a good quality video tape is played back on a VCR the best S/N is achieved due to a sufficiently large played-back signal. Accordingly, it is sufficient to provide only a slight picture quality correction by reducing the suppression of the noise component and by not carrying out correction of the high-frequency component.

Furthermore, when, for example, an image recorded on a poor quality video tape is played back, picture quality correction is carried out depending on the magnitude of the amplitude of the FM signal. Accordingly, when, for example, the amplitude of the FM signal is small, the S/N of the luminance signal can be improved by eliminating the noise component and suppressing the emphasis of the noise component included in the high-frequency component. This is done by emphasizing the amount of noise suppression in the horizontal direction and attenuating the high-frequency component.

Conversely, when the amplitude of the FM signal is large and the S/N is good from the start, the amount of noise suppression in the horizontal direction is decreased and the high-frequency component is emphasized. As a result, a high-definition image with a good S/N can be achieved. Here, the S/N is further improved since the amount of noise suppression in the vertical direction is increased by a specified amount.

Thus, along with doing away with the sole reliance on the frequency characteristic for picture quality correction, there is also the advantage that the appropriate picture quality correction is carried out automatically, irrespective of the quality of the recording medium, such as a video tape, and irrespective of the picture quality etc. of the image entered from another device.

Figure 14:
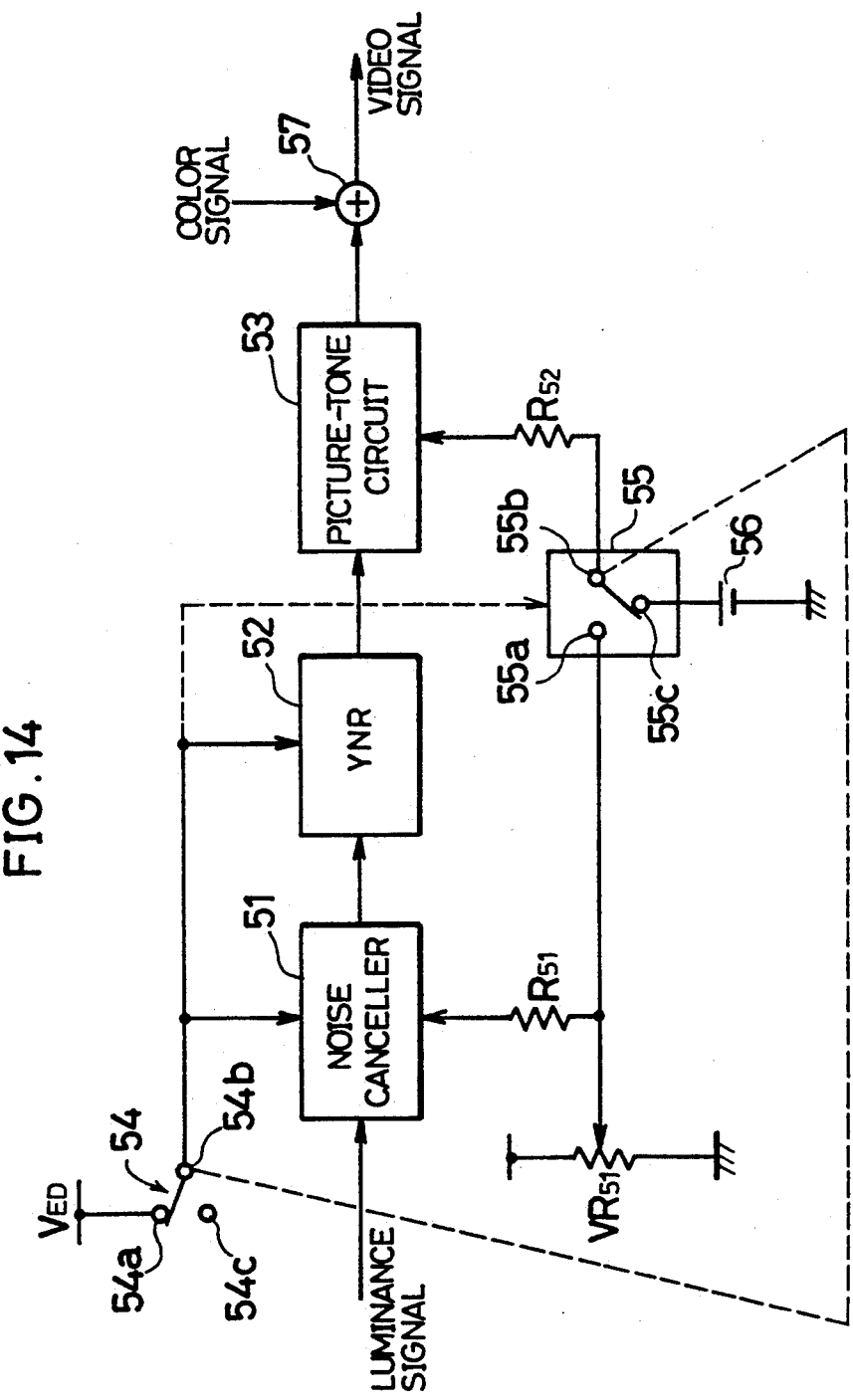
FIG. 14 is a block diagram showing the configuration of a picture quality correcting device of the fourth embodiment of the present invention.
Figure 15:
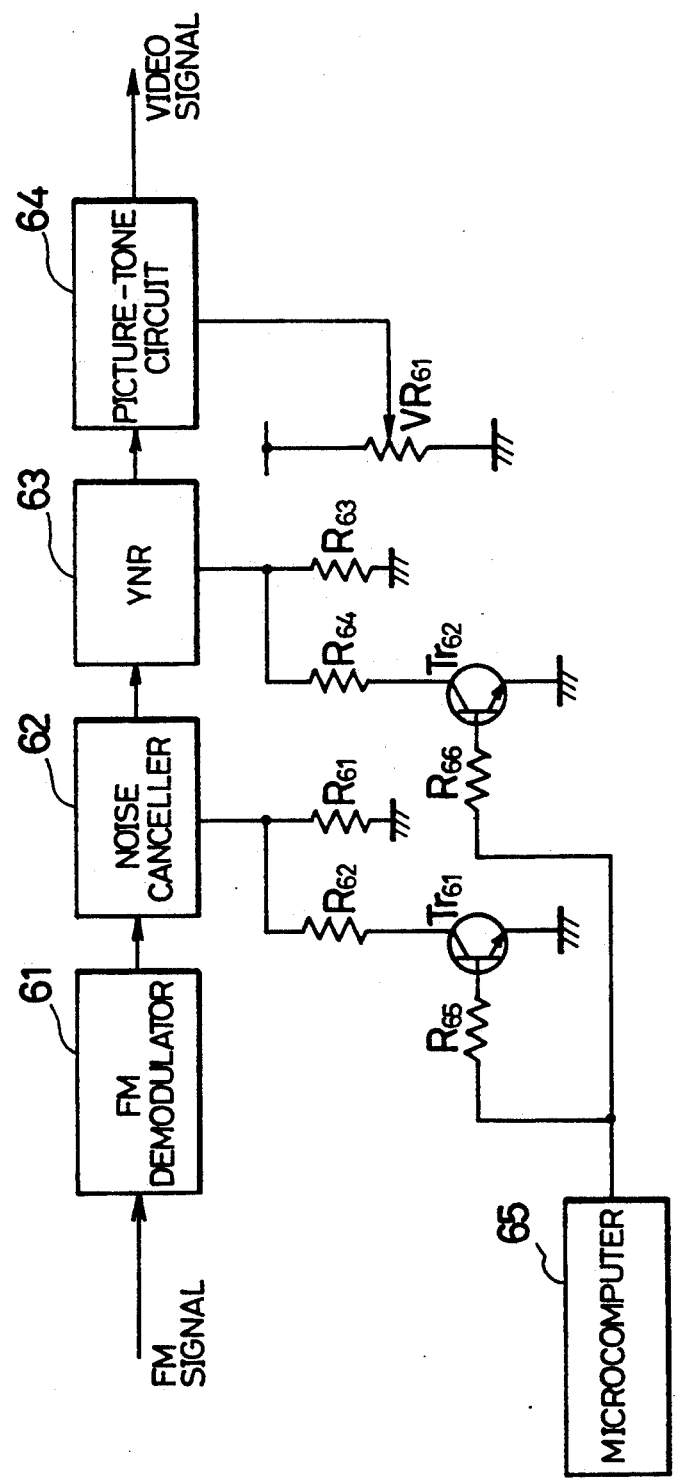
FIG. 15 is a block diagram showing an example of the configuration of a conventional picture quality correcting device.
Figure 16:
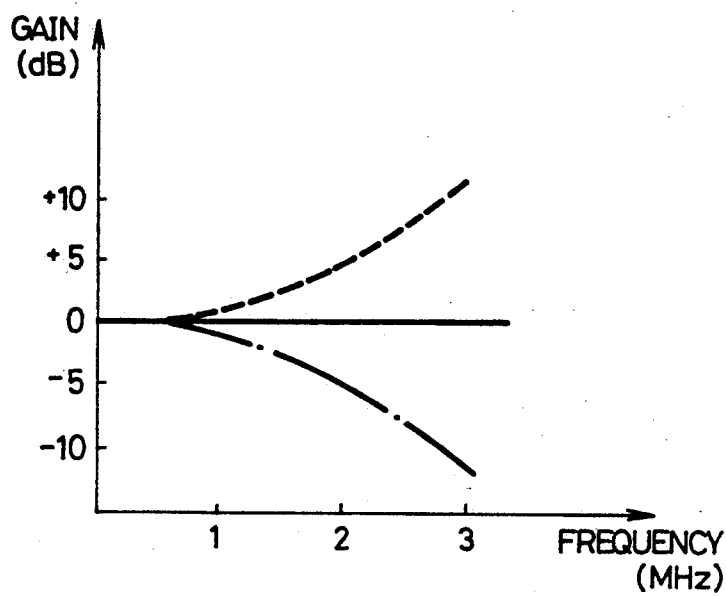
FIG. 16 shows the relationship between gain of the picture-tone circuit in the picture quality correcting device shown in FIG. 15, and frequency.
Figure 17:
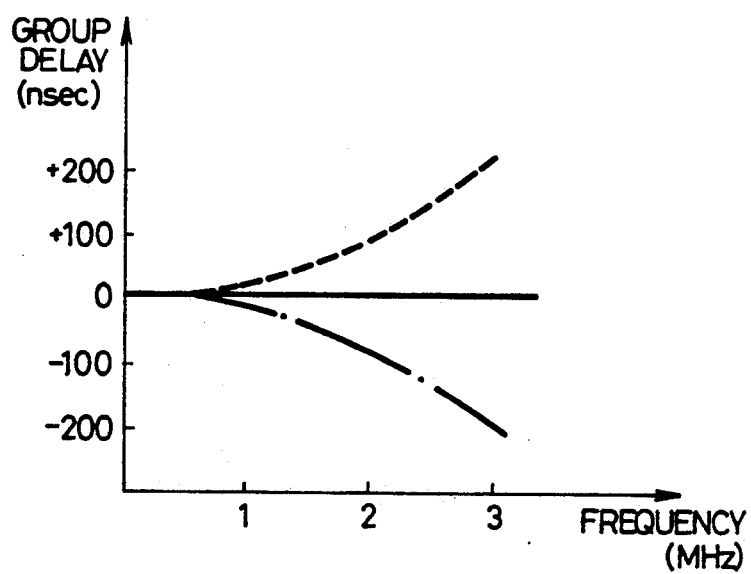
FIG. 17 shows the relationship between group delay of the picture-tone circuit in the picture quality correcting device shown in FIG. 15, and frequency.
Figure 18:
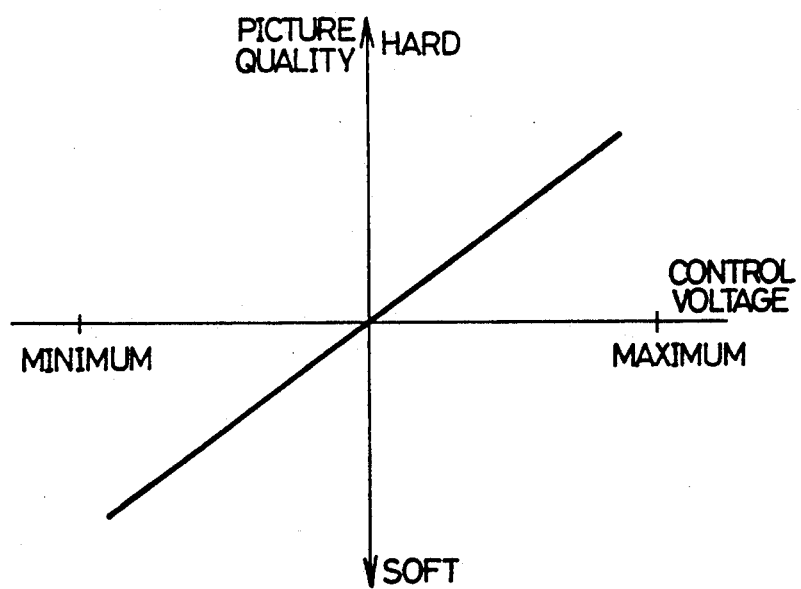
FIG. 18 shows the relationship between the extent of picture quality correction of the picture-tone circuit in the picture quality correcting device shown in FIG. 15, and control voltage.
Figure 19:
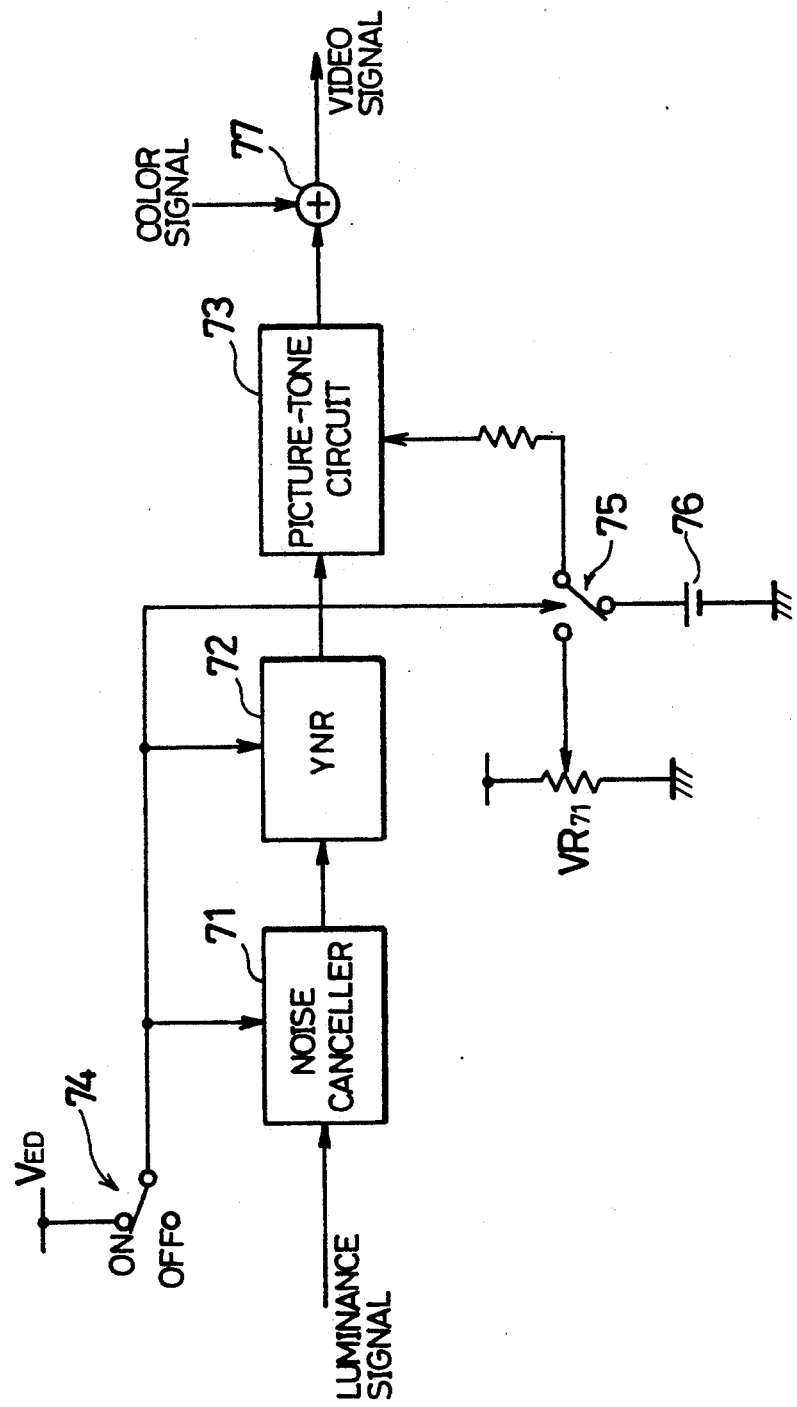
FIG. 19 is a block diagram showing an another example of the configuration of a conventional picture quality correcting device.

A fourth embodiment of the present invention, as used in a VCR, is described hereinbelow, referring to FIGS. 2, 3 and 14.

The VCR of the present embodiment is provided with a picture quality correcting device in a luminance signal processing section of its reproduction system. The picture quality correcting device has the configuration shown in FIG. 14; it comprises a noise canceller 51, a YNR 52, a picture-tone circuit 53, an edit-switch 54, a change-over switch 55 and a picture quality adjuster $VR_{51}$.

The noise canceller 51 serves as a fourth horizontal direction noise suppressing means and basically operates in the same way as the noise canceller 1 of the first embodiment, except that it limits noise suppression to, for example, approximately half when a voltage $V_{ED}$ is applied via the edit switch 54, described later. Consequently, the noise canceller 51 sets, for example, the limiting level of a limiter according to this voltage $V_{ED}$. Moreover, a control voltage is generated by the picture quality adjuster $VR_{51}$ and is applied to the noise canceller 51 via a resistor $R_{51}$. According to this control voltage, a composition ratio, based on which a noise component is composed in the luminance signal, is controlled, and the amount of noise suppression of the noise canceller 51 thereby becomes adjustable.

The YNR 52 serves as vertical direction noise suppressing means and carries out noise reduction using the fact that correlation exists between adjacent lines of an image. The YNR 52 comprises a recursion comb filter provided with a 1 H delay element. The YNR 52 reduces the amount of noise suppression by a specified amount by varying the amount of feedback of the output signal to the input terminal of the 1 H delay element according to the voltage $V_{ED}$.

The picture-tone circuit 53 serves as a fourth frequency characteristic correcting means and operates similarly to the picture-tone circuit 2 of the first embodiment. The high-frequency component of the luminance signal is corrected according to the characteristic shown in FIG. 3.

The edit switch 54 comprises contact points 54a and 54c, and a common terminal 54b. The respective connections of the common terminal 54b with the contact points 54a and 54c are switched manually. The voltage $V_{ED}$ is applied to the contact point 54a. The common terminal 54b is connected to the noise canceller 51, the YNR 52 and the control input terminal of the change-over switch 55 respectively. The contact point 54c is kept unconnected. The edit switch 54 serves as picture quality switching means: when detailed portions of an image are to be rendered during dubbing etc., the contact point 54a and the common terminal 54b are connected and the voltage $V_{ED}$ is applied to the noise canceller 51, the YNR 52 and the change-over switch 55; when normal play-back is carried out, the contact point 54c and the common terminal 54b are connected and the voltage $V_{ED}$ is no longer applied.

The change-over switch 55 comprises contact points 55a and 55c and a common terminal 55b. When the voltage $V_{ED}$ is not applied, the contact point 55a and the common terminal 55b get connected and a control voltage generated by the picture quality adjuster $VR_{51}$ is applied to the picture-tone circuit 53 via a resistor $R_{52}$. When, on the other hand, the voltage $V_{ED}$ is applied, the contact point 55c and the common terminal 55b get connected and a voltage from the DC power source 56 is applied to the picture-tone circuit 53.

That is, the change-over switch 55 serves as picture quality correspondence control voltage switching means: it is interlinked and operates in conjunction with the edit switch 54, and switches the control voltage applied to the picture-tone circuit 53. The voltage of the DC power source 56 is set to a value at which the picture-tone circuit 53 operates so as to flatten the frequency characteristic of the luminance signal.

With the above arrangement, when normal play-back is to be carried out, the normal play-back mode is selected: the edit switch 54 is turned to OFF by connecting the contact point 54c and the common terminal 54b. In this case, the voltage $V_{ED}$ is not applied to the noise canceller 51, the YNR 52 and the change-over switch 55. As a result, the noise canceller 51 and the YNR 52 operate normally, and the change-over switch 55 connects the picture quality adjuster $VR_{51}$ and the picture-tone circuit 53. Consequently, the amount of noise suppression of the noise canceller 51 and the amount of high-frequency component correction of the picture-tone circuit 53 is controlled by adjusting the picture quality adjuster $VR_{51}$.

When dubbing is to be carried out, the edit mode is selected: the edit switch 54 is turned to ON by connecting the contact point 54a and the common terminal 54b. In this case, the voltage $V_{ED}$ is applied to the noise canceller 51, the YNR 52 and the change-over switch 55. As a result, the noise suppression of the noise canceller 51 is limited to a range corresponding to approximately half the normal amount and the YNR 52 does not carry out suppression of the noise component. Furthermore, the contact point 55c and the common terminal 55b of the change-over switch 55 get connected and the voltage from the DC power source 56 is applied to the picture-tone circuit 53.

Here, the amount of noise suppression of the noise canceller 51 is controlled by the picture quality adjuster $VR_{51}$ within the range in which the noise suppression is limited, as described above. The picture-tone circuit 53 does not correct the high-frequency component. The luminance signal released by the picture-tone circuit 53 becomes a video signal after being mixed in a mixing circuit 57 with a color signal. The video signal is then sent to a VCR in which the recording takes place.

As described above, in the present embodiment, the amount of noise suppression of the noise canceller 51 is arranged to be variable according to an adjustment of the picture quality adjuster $VR_{51}$ even when, during dubbing, the noise suppression is limited by means of the edit mode. As a result, even when an image with a bad S/N is dubbed, the noise in the dubbed image can be reduced. Moreover, when play-back is carried out in the edit mode, there is practically no occurrence of phase shift of the image since the picture-tone circuit 53 does not carry out correction of the frequency characteristic.

Thus, the fourth horizontal direction noise suppressing means of the picture quality correcting device of the present invention makes the amount of noise suppression variable at least when detailed portions of the image are to be rendered.

In other words, the amount of noise suppression is made adjustable when a limitation is introduced in picture quality correction by making the correction characteristic of the luminance signal constant. Consequently, deterioration of the S/N of the image can be prevented.

As a result, when, for example, dubbing is carried out using a VCR or the like, even when an image with a poor S/N is played back, only a mild deterioration takes place of the S/N of the copied image, and deterioration of picture quality during dubbing is prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A picture quality correcting device comprising:
   first horizontal direction noise suppressing means for suppressing noise in the horizontal direction of an image by extracting a noise component from a luminance signal and deducting this noise component from an original luminance signal; and
   first frequency characteristic correcting means for correcting the frequency characteristic of the luminance signal by adjusting a high-frequency component according to a control voltage, said first horizontal direction noise suppressing means and said first frequency characteristic correcting means being controlled by an externally supplied control voltage,
   the first horizontal direction noise suppressing means being arranged so that the higher the control voltage, the less the amount of noise suppression, and
   the first frequency characteristic correcting means being arranged
   so that it does not correct the high-frequency component within a specific range of the control voltage, this specified range including a value of the control voltage which serves as the central value for correction;
   so that, in a voltage range higher than the specified range, the higher the control voltage, the more the attenuation of the high-frequency component; and
   so that, in a voltage range lower than the specified range, the lower the control voltage, the more the emphasis of the high-frequency component.

2. The picture quality correcting device as set forth in claim 1, the first horizontal direction noise suppressing means including:
   a high-pass filter circuit for extracting the high-frequency component of the luminance signal;
   a limiting level control circuit for generating a limiting level which varies according to the control voltage;
   a limiter circuit for limiting the amplitude of the high-frequency component according to the limiting level, and for drawing out the noise component;
   an inversion circuit for inverting the polarity of the noise component;
   a level adjustment circuit for adjusting the inverted noise component to the level of the luminance signal; and a composition circuit for deducting the noise component from the luminance signal by composing the luminance signal with an output of the level adjustment circuit.

3. The picture quality correcting device as set forth in claim 2, the level adjustment circuit including a variable resistor.

4. The picture quality correcting device as set forth in claim 1, the first frequency characteristic correcting means including:

dead band setting means for releasing a specified voltage with respect to a control voltage within a specified range, making the specified range into a dead band; and correcting means for correcting the high-frequency component of the luminance signal according to the output of the dead band setting means when the control voltage lies outside the dead band, the correcting means not correcting the high-frequency component of the luminance signal when the control voltage lies within the dead band.

5. The picture quality correcting device as set forth in claim 4, the dead band setting means releasing the specified voltage when the value of the control voltage lies within the specified range of the dead band; the dead band setting means being arranged so that the smaller the control voltage with respect to the dead band, the larger the voltage released by the dead band setting means, and the larger the control voltage with respect to the dead band, the smaller the voltage released by the dead band setting means, and the correcting means being arranged so that the larger the output of the dead band setting means, the more the correction of the high-frequency component by the correcting means.

6. The picture quality correcting device as set forth in claim 4, the dead band setting means including:

lower limit setting means for setting a lower limit of the dead band;

upper limit setting means for setting an upper limit of the dead band;

attenuating means for expanding the dynamic ranges of the lower limit setting means and upper limit setting means; and means for generating a central voltage of the dead band.

7. The picture quality correcting device as set forth in claim 4, the dead band setting means including:

a first transistor and a second transistor for determining a lower limit of the dead band; and a third transistor and a fourth transistor for determining an upper limit of the dead band, an emitter of the first transistor being connected to a power line via a first resistor and being grounded via a second resistor, a collector thereof being connected to the correcting means via a third resistor and grounded via a fourth resistor, the second transistor being provided for temperature compensation of the first transistor, its collector being connected to the power line, and its emitter being connected to a base of the first transistor and being grounded via a fifth resistor, a collector of the third transistor being connected to the power line via a sixth resistor, and to the correcting means via a seventh resistor, and its emitter being connected to the power line via an eighth resistor and grounded via a ninth resistor, the fourth transistor being provided for temperature compensation of the third transistor, its emitter being connected to a base of the third transistor and to the power line via a tenth resistor, and its collector being grounded, respective bases of the second transistor and the fourth transistor being connected to the power line via an eleventh resistor, grounded via a twelfth resistor, and connected to the control voltage via a thirteenth resistor, a fourteenth resistor being connected between the power line and the third resistor, a fifteenth resistor being connected between the seventh resistor and ground, so that an emitter voltage of the first transistor is set to become the lower limit of the dead band, and so that an emitter voltage of the third transistor is set to become the upper limit of the dead band.

8. The picture quality correcting device as set forth in claim 4, the dead band setting means including:

a first transistor and a second transistor for setting a lower limit of the dead band; and a third transistor and a fourth transistor for setting an upper limit of the dead band, an emitter of the first transistor being connected to a power line via a first resistor and being grounded via a second resistor, a collector thereof being connected to the correcting means via a third resistor and grounded via a fourth resistor, the second transistor being provided for temperature compensation of the first transistor, its collector being connected to the power line, and its emitter being connected to a base of the first transistor and being grounded via a fifth resistor, a collector of the third transistor being connected to the power line via a sixth resistor and being connected to the correcting means via a seventh resistor, and its emitter being connected to the power line via an eighth resistor and grounded via a ninth resistor, the fourth transistor being provided for temperature compensation of the third transistor, its emitter being connected to a base of the third transistor and to the power line via a tenth resistor, and its collector being grounded, respective bases of the second transistor and the fourth transistor being connected to the power line via an eleventh resistor, grounded via a twelfth resistor, and connected to the control voltage via a thirteenth resistor, an emitter voltage of the first transistor being set to become the lower limit of the dead band, and an emitter voltage of the third transistor being set to become the upper limit of the dead band by: making resistances of the third and seventh resistors equal; making the resistances of the fourth and sixth resistors equal; and arranging it so that $R_1 \cdot R_2/(R_1+R_2) = R_8 \cdot R_9/(R_8+R_9)$ is satisfied, where $R_1$ is the first resistor, $R_2$ the second resistor, $R_8$ the eighth resistor, and $R_9$ the ninth resistor.

9. A picture quality correcting device comprising:

horizontal direction noise suppressing means for suppressing noise in the horizontal direction of an image by extracting a noise component from a luminance signal and deducting this noise component from an original luminance signal; and frequency characteristic correcting means for correcting the frequency characteristic of the luminance signal by adjusting a high-frequency component according to a control voltage, the frequency characteristic correcting means being arranged so that it does not correct the high-frequency component within a specified range of the control voltage, this specified range including a value of the control voltage which serves as the central value for correction;

so that, in a voltage range higher than the specified range, the higher the control voltage, the more the attenuation of the high-frequency component; and so that, in a voltage range lower than the specified range, the lower the control voltage, the more the emphasis of the high-frequency component, the horizontal direction noise suppressing means being arranged so that the amount of noise suppression is minimized at a value of the control voltage which corresponds to or is greater than a maximum value of the specified range; and so that the amount of noise suppression increases when the control voltage both rises above and falls below this minimizing value.

10. The picture quality correcting device as set forth in claim 9, the horizontal direction noise suppressing means including:

a high-pass filter circuit for extracting the high-frequency component of the luminance signal;

a limiting level control circuit for generating a limiting level which varies according to the control voltage;

a limiter circuit for limiting the amplitude of the high-frequency component according to the limiting level and for drawing out the noise component;

an inversion circuit for inverting the polarity of the noise component;

a level adjustment circuit for adjusting the level of the inverted noise component so that the amount of noise suppression is controlled; and a composition circuit for deducting the noise component from the luminance signal by composing the luminance signal with an output of the level adjustment circuit.

11. The picture quality correcting device as set forth in claim 9, the value of the control voltage at which the amount of noise suppression is minimized being set in a range lying between an upper-limit value of the specified range and the maximum value of the control voltage.

12. The picture quality correcting device as set forth in claim 9, the frequency characteristic correcting means including:

dead band setting means for releasing a specified voltage with respect to a control voltage within a specified range, making the specified range into a dead band; and correcting means for correcting the high-frequency component of the luminance signal according to the output of the dead band setting means when the control voltage lies outside the dead band, the correcting means not correcting the high-frequency component of the luminance signal when the control voltage lies within the dead band.

13. The picture quality correcting device as set forth in claim 12, the dead band setting means releasing the specified voltage when the value of the control voltage lies within the specified range of the dead band, the dead band setting means being arranged so that the smaller the control voltage with respect to the dead band, the larger the voltage released by the dead band setting means, and the larger the control voltage with respect to the dead band, the smaller the voltage released by the dead band setting means, and the correcting means being arranged so that the larger the output of the dead band setting means, the more the correction of the high-frequency component by the correcting means.

14. A picture quality correcting device comprising:

horizontal direction noise suppressing means for suppressing noise in the horizontal direction of an image by extracting a noise component from a luminance signal and deducting this noise component from an original luminance signal;

vertical direction noise suppressing means for suppressing noise in the vertical direction of the image by utilizing the correlation that exists between adjacent lines;

frequency characteristic correcting means for correcting the frequency characteristic of the luminance signal by adjusting a high-frequency component according to a control voltage;

envelope detecting means for detecting the envelope of a frequency-modulated luminance signal and for releasing a detection voltage;

control voltage switching means for selecting, as the control voltage, either a reference voltage, or the detection voltage of the envelope detecting means; and noise suppression controlling means for increasing the amount of noise suppression of the vertical direction noise suppressing means by a constant amount when the control voltage switching means selects the detection voltage as the control voltage, the horizontal noise suppressing means being arranged so that the higher the control voltage, the less the amount of noise suppression, the frequency characteristic correcting means being arranged so that it does not correct the high-frequency component of the demodulated luminance signal within a specified range of the control voltage, this specified range including a value of the control voltage which serves as the central value for correction;

so that, in a voltage range higher than the specified range, the higher the control voltage, the more the attenuation of the high-frequency component; and so that, in a voltage range lower than the specified range, the lower the control voltage, the more the emphasis of the high-frequency component.

15. The picture quality correcting device as set forth in claim 14, the envelope detecting means comprising a peak detection circuit for carrying out peak detection of the amplitude of the frequency modulated signal, and an amplifier circuit.

16. The picture quality correcting device as set forth in claim 14, the reference voltage being set to be substantially the same as the detection voltage released by the envelope detecting means when recording and reproduction are carried out on and from a standard video tape using the same video tape recorder.

17. The picture quality correcting device as set forth in claim 14, the control voltage switching means including a first switching circuit, and the noise suppression controlling means including a second switching circuit.

18. The picture quality correcting device as set forth in claim 17, the switching operation of the first switching circuit and the second switching circuit being interlinked, wherein, during automatic picture quality correction, the detection voltage is selected as the control voltage by the first switching circuit, and a switching of the second switching circuit from no-voltage to a specified voltage is carried out, the amount of noise suppression of the vertical direction noise suppressing means thereby being increased by a constant amount, and during manual picture quality correction, the reference voltage is selected as the control voltage by the first switching circuit, and a switching of the second switching circuit from the specified voltage to no-voltage is carried out, the amount of noise suppression of the vertical direction noise suppressing means thereby being reduced to zero.

19. The picture quality correcting device as set forth in claim 14, the vertical direction noise suppressing means including a recursive comb filter provided with a 1 H delay element.

20. The picture quality correcting device as set forth in claim 14, the vertical direction noise suppressing means including a line noise canceller which carries out noise suppression using line correlation of the luminance signal.

21. A picture quality correcting device comprising:
a horizontal direction noise suppressing means for suppressing noise in the horizontal direction of an image by extracting a noise component from a luminance signal and deducting this noise component from an original luminance signal;
a frequency characteristic correcting means for correcting the frequency characteristic of the luminance signal by adjusting a high-frequency component according to a control voltage;
noise suppression limiting means for limiting, relative to a normal amount, the amount of noise suppression of the horizontal direction noise suppressing means when detailed portions of the image are to be rendered; and
picture quality correspondence control voltage switching means for making the control voltage variable at normal times, and for switching the control voltage to a constant voltage when the detailed portions of the image are to be rendered,
the horizontal direction noise suppressing means making the amount of noise suppression variable at least when the detailed portions of the image are to be rendered.

22. A picture quality correcting device comprising:
horizontal direction noise suppressing means for suppressing noise in the horizontal direction of an image by extracting a noise component from a luminance signal and deducting this noise component from an original luminance signal;
vertical direction noise suppressing means for suppressing noise in the vertical direction of the image by utilizing the correlation that exists between adjacent lines;
a frequency characteristic correcting means for correcting the frequency characteristic of the luminance signal by adjusting a high-frequency component according to a control voltage;
picture quality switching means for selecting a specified edit voltage in an edit mode, and selecting no-voltage during normal play-back; and
picture quality correspondence control voltage switching means for selecting a reference voltage as the control voltage in response to the edit voltage when the edit voltage is selected by the picture quality switching means, and for supplying the reference voltage to the frequency characteristic correcting means, wherein
in the edit mode,
a limiting level of a limiting circuit, provided in the horizontal direction noise suppressing means, is set according to an output of the picture quality switching means, the amount of noise suppression being limited more than during normal play-back, and, even though the amount of noise suppression has been limited, the amount of noise suppression by the horizontal direction noise suppressing means being variable, and
the vertical direction noise suppressing means does not carry out suppression of the noise component.

23. The picture quality correcting device as set forth in claim 22, the amount of noise suppression in the edit mode being limited to substantially half the amount of noise suppression during normal play-back.

24. The picture quality correcting device as set forth in claim 22, the horizontal direction noise suppressing means making the amount of noise suppression adjustable by controlling a composition ratio according to the control voltage, the noise component being composed in the luminance signal based on the composition ratio.

* * * * *